United States Patent
Totsuka et al.

(10) Patent No.: US 6,856,471 B2
(45) Date of Patent: Feb. 15, 2005

(54) OBJECTIVE OPTICAL ELEMENT, OPTICAL PICK-UP APPARATUS, AND OPTICAL INFORMATION RECORDING REPRODUCING APPARATUS

(75) Inventors: Hidekazu Totsuka, Hachioji (JP); Shinichiro Saito, Hachioji (JP); Katsuya Sakamoto, Hachioji (JP); Kiyono Ikenaka, Hino (JP)

(73) Assignee: Konica Corporation, Tokyo (JP)

( * ) Notice: Subject to any disclaimer, the term of this patent is extended or adjusted under 35 U.S.C. 154(b) by 150 days.

(21) Appl. No.: 10/368,784

(22) Filed: Feb. 19, 2003

(65) Prior Publication Data

US 2003/0174417 A1 Sep. 18, 2003

(30) Foreign Application Priority Data

| Feb. 22, 2002 | (JP) | 2002-045979 |
| Mar. 18, 2002 | (JP) | 2002-073988 |
| Aug. 14, 2002 | (JP) | 2002-236196 |

(51) Int. Cl.$^7$ ................................. G02B 3/02
(52) U.S. Cl. .............. 359/719; 369/112.01; 369/112.06
(58) Field of Search ................. 359/618, 634, 359/637, 719; 369/112.01, 112.03, 112.05, 112.06, 112.07, 112.08, 112.11, 112.12, 112.13

(56) References Cited

U.S. PATENT DOCUMENTS

| 5,889,748 A | 3/1999 | Minemura |
| 5,987,924 A | 11/1999 | Lee |
| 6,118,594 A | 9/2000 | Maruyama |
| 6,400,672 B2 * | 6/2002 | Arai et al. .............. 369/112.26 |
| 6,515,808 B2 * | 2/2003 | Saito .......................... 359/721 |
| 6,597,519 B2 * | 7/2003 | Saito .......................... 359/719 |
| 2001/0002186 A1 | 5/2001 | Maruyama |
| 2001/0008512 A1 | 7/2001 | Maruyama |
| 2001/0028626 A1 | 10/2001 | Arimoto et al. |
| 2002/0060973 A1 | 5/2002 | Maruyama |

FOREIGN PATENT DOCUMENTS

EP          0820056 A        1/1998

* cited by examiner

*Primary Examiner*—Georgia Epps
*Assistant Examiner*—Darryl J. Collins
(74) *Attorney, Agent, or Firm*—Cohen, Pontani, Lieberman & Pavane

(57) ABSTRACT

An objective optical element for use in an optical pickup apparatus, includes an objective lens to converge the light flux emitted from the first and second light sources; and an optical functional surface including a common region and an exclusive region. When a first optical information medium is used, a sine condition unsatisfied-amount whose value is maximum exists on the common region. The following formula is satisfied:

$$0.5 \leq COMA2/COMA1 \leq 1.0$$

where COMA1 is a coma aberration ($\lambda 1$ rms) when a light flux goes slantingly to be incident with a view angle of 1° onto the objective optical element when the first optical information medium is used, and COMA2 is a coma aberration ($\lambda 2$ rms) when a light flux goes slantingly to be incident with a view angle of 1° onto the objective optical element when the second optical information medium is used.

87 Claims, 17 Drawing Sheets

SINE CONDITION

OBJECTIVE OPTICAL ELEMENT, OPTICAL PICK-UP APPARATUS, AND OPTICAL INFORMATION RECORDING REPRODUCING APPARATUS

BACKGROUND OF THE INVENTION

The present invention relates to an objective optical element used for an optical pick-up apparatus by which the recording/reproducing of an optical information recording medium whose operating wavelength is different and transparent substrate thickness is different is conducted by one objective lens, and optical pick-up apparatus and optical information recording reproducing apparatus, and particularly to the objective optical element in which a light source portion which oscillates the different wavelength is used for the modularized light source (2-laser 1 package module), or used for an optical system in which the focal length of the objective lens is short and which is sensitive to the error factors, and in which the image height coma characteristic at the time when each optical information recording medium is used, is improved, and the optical pick-up apparatus using it, and the optical information recording reproducing apparatus.

Nowadays, many kinds of optical information recording media exist, and the regulations for these optical information recording media are determined as shown in [Table 1]. In this connection, after this (the lens data in Table is included), it is defined that the exponent of 10 (for example, $2.5 \times 10^{-3}$) is expressed by using E (for example, 2.5×E-3).

TABLE 1

| Optical disk | Transparent substrate thickness (mm) | Necessary numerical aperture NA (light source wavelength $\lambda$ nm) |
| --- | --- | --- |
| CD, CD-R (reproducing) | 1.20 | 0.45 ($\lambda$ = 780 nm) |
| CD-R (recording, reproducing) | 1.20 | 0.50 ($\lambda$ = 780 nm) |
| DVD | 0.60 | 0.60 ($\lambda$ = 635 nm) |

Herein, as the media for which the interchangeability of mutual optical information recording media whose recording density is different is required, there are DVD and CD. In these optical information recording media, as shown in [Table 1], respectively, each transparent substrate thickness is different. In order to secure the interchangeability, it is necessary that the spherical aberration generated by the difference of this transparent substrate thickness is corrected by any means. Further, in DVD and CD, because the required numerical aperture is different, any countermeasure is necessary also for this.

In order to realize the optical pick-up apparatus having the interchangeability of the DVD/CD, the objective lens on which the diffractive structure is provided, is developed. As such an objective lens, for example, on the one side surface of the objective lens, the diffractive structure which is different at the inside or outside of the specific height h from the optical axis is provided, and in the inside region, the spherical aberration is corrected for each transparent substrate thickness, and in the outside region, the spherical aberration is corrected only for the DVD, and there is a diffractive structure in which the spherical aberration is not corrected for the CD, but is made flare. When the objective lens is structured in this manner, on each of optical information recording media, the converging spot which is respectively required at the time of the recording or reproducing of the information can be adequately formed.

In this connection, when such a diffractive structure is used for the objective lens, the correction of the spherical aberration when the information is recorded or reproduced on both of DVD/CD can be comparatively easily conducted. However, as the optical characteristic deterioration factor to obstacle the recording or reproducing of the adequate information, the coma also exists other than the spherical aberration. In the case where the coma is large, when the light flux tilted to the optical axis is incident, by the inclination of the objective lens generated due to the assembling error, there is a possibility that the formation of the adequate spot on the optical information recording medium is obstructed. However, when the above-described diffractive structure is used, both of the spherical aberrations at the time when both of the DVD/CD are used, can be reduced, but for the coma, there is a problem that the both can not be simultaneously corrected.

Particularly, as the light source of the optical pick-up apparatus to attain the interchangeability of the DVD/CD, a light source in which 2 semiconductor lasers called so-called "2-laser 1 package", are assembled on one substrate and are made as one unit, is well known. When such a light source is used, and the recording or reproducing of the information is conducted for both of the DVD/CD, for example, when the light source for the DVD is arranged on the optical axis of the objective lens, the light source for the CD is arranged at the position dislocated from the optical axis without fail, and accordingly, in such a case, it can be said that it is preferable that the coma when the CD is used, is reduced as much as possible.

SUMMARY OF THE INVENTION

In view of the above-described problems, the present invention is attained, and the object of the present invention is to provide an objective optical element for the optical pick-up apparatus by which the coma can be corrected with good balance, and the recording or reproducing of the information can be adequately conducted onto the different optical information recording media, and the optical pick-up apparatus and the optical information recording reproducing apparatus.

An objective optical element of the optical pick-up apparatus described in Item 1 is an objective optical element of the optical pick-up apparatus having: the first light source of a wavelength $\lambda 1$ in which, when the light flux is irradiated onto the first optical information recording medium whose transparent substrate thickness is t1, the recording or reproducing of the information is conducted; the second light source of a wavelength $\lambda 2$ ($\lambda 1 < \lambda 2$) in which, when the light flux is irradiated onto the second optical information recording medium whose transparent substrate thickness is t2 (t1<t2), the recording or reproducing of the information is conducted; and a light converging optical system including the objective optical element by which the light flux emitted from the first and second light sources are converged onto the information recording surface through the transparent substrates of the first and second optical information recording media, and the objective optical element has: an objective lens by which the light fluxes from the first and second light sources are converged, and an optical function surface to give the optical action to the light flux, and the optical function surface of the objective optical element has a common region which includes the optical axis and is used for recording and/or reproducing of the information onto both of the first optical information recording medium and the second optical information recording medium, and the exclusive region which is provided outside (a side separated from the optical axis, the same hereinafter) of the common region, and used for the recording and/or reproducing of the information mainly for the first optical information recording medium, and the objective optical element forms the spot diameter on the first optical information recording medium determined from the effective diameter and the focal length of the objective optical element, and when the first optical information recording medium is used, a case where the sine condition unsatisfied amount is maximum exists in the common region, and when the coma generated when the light flux is obliquely incident on the objective optical element at the angle of view 1° at the time of use of the first optical information recording medium, is defined as COMA1 (λ1 rms), and the coma generated when the light flux is obliquely incident on the objective optical element at the angle of view 1° at the time of use of the second optical information recording medium, is defined as COMA2 (λ2 rms), the objective optical element is characterized in that it satisfies:

$$0.5 \leq COMA2/COMA1 \leq 1.0 \quad (1)$$

In this connection, as to the coma, when the third order coma of the wave front aberration relating to the light flux from the light source of the wavelength λ is ΔW3 (λrms), the 5th order coma is Δ W5 (λrms), and the 7th order coma is ΔW7 (λrms), the coma COMA (λrms) is obtained by the following expression.

$$COMA = \{(\Delta W3)^2 + (\Delta W5)^2 + (\Delta W7)^2\}^{1/2} \quad (1')$$

The present inventors find, as the result of the study, that these problems can be solved when the objective lens design, particularly, the sine condition unsatisfied amount design is considered again. Further, for the common region of the first optical information recording medium (for example, DVD) and the second optical information recording medium (for example, CD), when the status of the sine condition unsatisfied amount of the first optical information recording medium is considered, the more preferable design of the sine condition unsatisfied amount of the first optical information recording medium exclusive region is found. Furthermore, when the wave front aberration amount of the coma generated when the first and the second optical information recording media are used (which is also called the time of the recording or reproducing of the information) is suppressed, it is found that the generation of the coma can be suppressed also for any one of the optical information recording media which are strong for the arrangement error of the 2-laser 1 package module, and is used outside the axis without fail. This technology is effective also for the optical pick-up apparatus in which the 2-laser 1 package module light source is not used, and also for the objective optical element whose focal length is shortened in order to reduce its size.

Herein, the sine condition means, as shown in FIG. 1, in the case where the ray of light of the height $h_1$ from the optical axis is incident on the lens parallely to the optical axis, when the emitting angle when such a ray of light is emitted from the lens is U, that '$h_1$/sin U' satisfies the constant value. When this is constant in spite of the height $h_1$ from the optical axis, the sine condition is satisfied, and it can be regarded that the lateral magnification of each ray of light in the effective diameter is constant. Although this sine condition is a calculated value on the axis, it is effective for conducting the lateral magnification error outside the axis (that is, the outside-axis coma) correction.

However, in the present invention, when the thickness of the protective substrate of the optical information recording medium which is within the scope of such a technology is different, there is the following problem. When the sine condition is perfectly corrected when one hand (the first) optical information recording medium (for example, the thickness is t1) is used, in the sine condition when the other hand (the second) optical information recording medium of the thickness is t2 is used, the dislocation amount from the constant value is large, and as the result, there is a characteristic that the outside-axis coma becomes large. The present inventors find that, in the case where the sine condition unsatisfied amount in such a case is defined as SC=$h_1$/sin U−f, when the sine condition unsatisfied amount at the height $h_1$ of the ray of light in the effective diameter, is designed by respectively being distributed when the first optical information recording medium and the second optical information recording medium are used, as the result, the outside-axis coma when each optical information recording medium is used, can be balanced. More specifically, when the expression (1) is satisfied, the above effect can be obtained.

On the one hand, when the absolute value of the sine condition unsatisfied amount is made too large, the following trouble is produced. Although the necessary numerical aperture is determined for each optical information recording medium, this relates also to the spot size on the optical information recording medium surface. Herein, when the sine condition unsatisfied amount becomes positive, because the inclination angle of the ray of light after the outgoing of the objective optical element (the objective lens in the example described later) becomes small, even when the same effective diameter light flux is incident on the objective optical element with the same focal length in which the sine condition unsatisfied amount is corrected, the spot diameter formed on the optical information recording surface can not be stopped down. When the desired spot diameter is tried to obtain, it is necessary that the stop diameter is made large, and the tracking margin is narrowed. Accordingly, it is preferable that the spot diameter obtained from the focal length of the ideal objective optical element and the effective diameter is formed on the optical information recording medium surface.

Herein, "optical function surface" means the lens surface of the objective optical element through which the light flux from each light source passes. In the present specification, it is defined as the range of the lens surface through which the light flux limited by the stop aperture diameter at the time of use of the first optical information recording medium passes.

Further, the meaning of "mainly" in the "used for the recording and/or the reproducing of the information mainly onto the first optical information recording medium" will be described. The light flux passing the exclusive region when the first optical information recording medium is used, is image-formed on the optical information recording medium surface when the objective lens is focus-defocused. Herein, the light flux passing the exclusive region when the second optical information recording medium is used, becomes the flare light at the position separated from the spot light at the time of the focus-defocus of the objective lens on the second optical information recording medium surface. Herein, the reason in which the word "mainly" is used, is from the reasons of the following 2 points. Initially, as the first reason, when the eyes are put on the sensor for the signal detection normally provided on the optical pick-up apparatus, depending on the aperture size of the sensor, the case where this flare light is incident in the sensor aperture is also generated. In this case, the defocus control of the objective lens is practically conducted, including also the flare light, and in the broad meaning, even when the second optical information recording medium is used, there is a case where the influence of the light flux passing this exclusive region is practically received. Further, as the second reason, the wave optically, when the phase difference between the flare light and spot light on the optical information recording medium is controlled, there is a case where the peak intensity of the airy disk of the spot light can also be increased. From these reasons, in order to avoid the unnecessary limitation in the present invention, the word of "mainly" is used.

Further, "objective optical element" may also be an element in which the optical function surface is provided on the optical surface of the objective lens, and other than the objective lens, the optical element on which the optical function surface is provided may also be separately provided.

An objective optical system of the optical pick-up apparatus described in Item 2, is an objective optical element of the optical pick-up apparatus having: the first light source of the wavelength λ1 by which the recording or reproducing of the information is conducted when the light flux is irradiated onto the first optical information recording medium whose transparent substrate thickness is t1; the second light source of the wavelength λ2 (λ1<λ2) by which the recording or reproducing of the information is conducted when the light flux is irradiated onto the second optical information recording medium whose transparent substrate thickness is t2 (t1<t2); and a light converging optical system including the objective optical element by which the light fluxes emitted from the first and the second light sources are converged on the information recording surface through the transparent substrates of the first and second optical information recording media, the objective optical system is characterized in that: the objective optical element has an objective lens to converge the light fluxes from the first and second light sources, and the optical function surface to give the optical action to the light flux; and the optical function surface of the objective optical element includes the optical axis, and has the common region which is used for the recording and/or reproducing of the information to both of the first optical information recording surface and the second optical information recording surface, and the exclusive region which is provided outside the common region, and is mainly used for the recording and/or reproducing of the information to the first optical information recording surface; the objective optical element forms the spot diameter on the first optical information recording medium determined from the effective diameter and the focal length of the objective optical element in the first optical information recording medium; and in the case where the infinite object distance ray of light whose height from the optical axis is h, is emitted from the objective optical element, when the angle formed between the ray of light after the emission and the optical axis is expressed by U, and the sine condition unsatisfied amount is defined as SC(h)=h/sinU−f (f: focal length of the objective optical element at the time of the use of respective information recording media), in the common region, the sign of the sine condition unsatisfied amount which is minimum when the first optical information recording medium is used, and the sign of the sine condition unsatisfied amount which is minimum when the second optical information recording medium is used, are negative.

In the invention described in Item 2, in the common region, because the sign of the sine condition unsatisfied amount (Q1 in FIG. 8(a)) which is minimum when the first optical information recording medium (for example, DVD) is used, and the sign of the sine condition unsatisfied amount (Q2 in FIG. 8(b)) which is minimum when the second optical information recording medium (for example, CD) is used, are negative, the outside-axis coma when each optical information recording medium is used, can be balanced.

An objective optical element of the optical pick-up apparatus described in Item 3, is characterized in that: in the case where the infinite objective distance ray of light whose height from the optical axis is h is out-gone from the objective optical element, when the angle formed between the ray of light after outgoing and the optical axis is expressed by U, and the sine condition unsatisfied amount is defined as SC(h)=h/sin U−f (f: focal length of the objective optical element at the time of the use of respective information recording media), when the maximum value of the sine condition unsatisfied amount absolute value in the common region when the first optical information recording medium is used, is SC1 max, and the maximum value of the sine condition unsatisfied amount absolute value in the common region when the second optical information recording medium is used, is SC2 max, it satisfies $$0.003 \text{ mm} \leq SC1\max \leq 0.020 \text{ mm} \tag{2}$$

$$0.010 \text{ mm} \leq SC2\max \leq 0.040 \text{ mm}. \tag{3}$$

When SC1 max and SC2 max are not smaller than the lower limit value, because the sine condition unsatisfied amount in the first optical information recording medium is not generally reduced, the outside-axis coma when the first optical information recording medium is used, becomes good. On the one hand, when SC1 max and SC2 max are not larger than the upper limit value, the outside-axis coma when the second optical information recording medium is used, becomes good.

An objective optical element of the optical pick-up apparatus described in Item 4 can provide the objective optical element to satisfy the spot diameter on the first optical information recording medium which is determined from the effective diameter and the focal length of the objective optical element in the first optical information recording medium, when the first optical information recording medium is used, in the case where the height from the optical axis of the ray of light passing the outermost peripheral portion of the effective diameter of the objective optical element is hmax, when the sine condition unsatisfied amount SC1 of the outermost peripheral ray of light satisfies $$|SC1(h\max)| \leq 0.010 \text{ mm}. \tag{4}$$

An objective optical element of the optical pick-up apparatus described in Item 5 is characterized in that: in the case where the infinite objective distance ray of light whose height from the optical axis is h is out-gone from the objective optical element, when the angle formed between the ray of light after the outgoing and the optical axis is expressed by U, and the sine condition unsatisfied amount is defined as SC(h)=h/sin U−f (f: focal length of the objective optical element when the respective optical information recording media are used), at the time of use of the first optical recording medium, a sign of the sine condition unsatisfied amount (Q1 in FIG. 8(a)) in which the absolute value of the sine condition unsatisfied amount is the maximum value in the common region, is negative.

An objective optical element of the optical pick-up apparatus described in Item 6 is characterized in that: in the case where the infinite objective distance ray of light whose height from the optical axis is h is out-gone from the objective optical element, when the angle formed between the ray of light after the outgoing and the optical axis is expressed by U, and the sine condition unsatisfied amount is defined as SC(h)=h/sin U−f (f: focal length of the objective optical element when the respective optical information recording media are used), at the time of use of the first optical recording medium, when the minimum value of the sine condition unsatisfied amount in the common region is $SC1_{Dmin}$, and the minimum value of the sine condition unsatisfied amount in the exclusive region is $SC1_{Smin}$ (refer to FIG. 8(a)), $$1.2 \cdot SC1_{Dmin} \leq SC1_{Smin}. \tag{5}$$

An objective optical element of the optical pick-up apparatus described in Item 7 is characterized in that: in the case where the infinite objective distance ray of light whose height from the optical axis is h is out-gone from the objective optical element, when the angle formed between the ray of light after the outgoing and the optical axis is expressed by U, and the sine condition unsatisfied amount is defined as SC(h)=h/sin U−f (f: focal length of the objective optical element when the respective optical information recording media are used), the sine condition unsatisfied amount when the first optical information recording medium is used, is discontinuous in the negative (−) side at a portion ($h_0$ in FIG. 8(a)) which is switched from the common region to the exclusive region.

An objective optical element of the optical pick-up apparatus described in Item 8 is characterized in that: in the case where the infinite objective distance ray of light whose height from the optical axis is h is out-gone from the objective optical element, when the angle formed between the ray of light after the outgoing and the optical axis is expressed by U, and the sine condition unsatisfied amount is defined as SC(h)=h/sin U−f (f: focal length of the objective optical element when the respective optical information recording media are used), a sign of the sine condition unsatisfied amount (Q3 in FIG. 8(a)) in which the sine condition unsatisfied amount is maximum in the common region when the first optical information recording medium is used, is positive.

An objective optical element of the optical pick-up apparatus described in Item 9 is characterized in that: in the case where the first optical information recording medium is used, when the infinite objective distance ray of light whose height from the optical axis is h is out-gone from the objective optical element, when the angle formed between the ray of light after the outgoing and the optical axis is expressed by U, and the sine condition unsatisfied amount is defined as SC(h)=h/sin U−f (f: focal length of the objective optical element when the first optical information recording media are used), when the sine condition unsatisfied amount of the ray of light passing the innermost peripheral portion of the exclusive region is defined as $SC1_{out}$ ($h_0$) and the minimum value of the sine condition unsatisfied amount in the common region is defined as $SC1_{Dmin}$, $$1.2 \cdot SC1_{Dmin} \leq SC1_{out}(h_0). \quad (6)$$

An objective optical element of the optical pick-up apparatus described in Item 10 is characterized in that: when the first optical information recording medium is used, the case where the absolute value of the sine condition unsatisfied amount is maximum, exists in the common region, and when the coma generated when the light flux is obliquely incident on the objective optical element at the angle of view of 1° when the first optical information recording medium is used, is COMA1(λ1 rms), and the coma generated when the light flux is obliquely incident on the objective optical element at the angle of view of 1° when the second optical information recording medium is used, is COMA1(λ1 rms), is COMA2 (λ2 rms), $$0.5 \leq COMA1/COMA2 \leq 1.0. \quad (7)$$

An objective optical element of the optical pick-up apparatus described in Item 11 is an objective optical element of the optical pick-up apparatus having: the first light source of the wavelength λ1 by which the recording or reproducing of the information is conducted when the light flux is irradiated onto the first optical information recording medium whose transparent substrate thickness is t1; the second light source of the wavelength λ2 (λ1<λ2) by which the recording or reproducing of the information is conducted when the light flux is irradiated onto the second optical information recording medium whose transparent substrate thickness is t2 (t1<t2); and the light converging optical system including the objective optical element by which the light fluxes emitted from the first and the second light sources are converged onto the information recording surface through the transparent substrates of the first and the second optical information recording media, the objective optical element is characterized in that: it has the objective lens by which the light flux from the first light source or second light source is converged, and the optical function surface to give the optical action to the light flux; the optical function surface of the objective optical element has the common region which includes the optical axis and is used for recording and/or reproducing of the information for both of the first optical information recording medium and the second optical information recording medium; and the exclusive region which is provided outside the common region and is mainly used for the recording and/or reproducing of the information for the first optical information recording medium; the objective optical element forms the spot diameter on the first optical information recording medium determined from the effective diameter and the focal length of the objective optical element in the first optical information recording medium; when the height from the optical axis is placed on the vertical line(x), and the sine condition unsatisfied amount when the second optical information recording medium is used, is placed on the horizontal line (y), and in the common region, the differential value (dy/dx) for the curve showing the relationship between the height from the optical axis and the sine condition unsatisfied amount is found, in the case where the second optical information recording medium is used, when the height from the optical axis of the ray of light passing the outmost peripheral portion of the effective diameter of the objective optical element is $h_{CDNA}$, $$\text{when } h < 0.6 h_{CDNA}, \text{ then } (dy/dx) \leq 0 \quad (8)$$

and at the first height from the optical axis, when the straight line in which the differential value is an inclination is drawn, at the farther side from the optical axis more than the first height, the curve has the region existing in the more positive side than the straight line.

FIG. 2 is a view in which the height from the optical axis is placed on the horizontal line (x), and the sine condition unsatisfied amount when the second optical information recording medium (for example, CD) is used, is placed on the vertical line (y), and which shows an example, in the common region and the exclusive region, in which the curve f2 showing the sine condition unsatisfied amount is found. Herein, the curve f2 is always negative, and the negative value is increased as the curve is separated from the optical axis. Further, at the first height x1, when the straight line d1 whose differential value is an inclination, is drawn (which means that the tangential line is drawn on the curve f2 at the first height x1), the curve f2 has an region R1 existing in the more positive side than the straight line (tangential line) at a further side from the optical axis than the first height x1. In this connection, between x1 and the region R1, it also has another region existing in the more negative side than the straight line d1. According to such a characteristic, the same effect as the invention described in Item 1, in which the coma outside the optical axis can be balanced when each optical information recording medium is used, can be obtained.

In this connection, at the fourth height x4, when the straight line whose differential value is an inclination (the tangential line drawn on the curve f2 at the fourth height x4) is drawn, at the nearer side from the optical axis than the first height x1, the curve f2 has an region R4 existing in the more positive side than the straight line (tangential line) d4.

An objective optical element of the optical pick-up apparatus described in Item 12 can obtain the curve described relating to the invention described in Item 11 because, when the first optical information recording medium is used, the curve showing the sine condition unsatisfied amount in the common region, when the height from the optical axis is placed on the vertical line (x) and the sine condition unsatisfied amount when the second optical information recording medium is used, is placed on the horizontal line (y), and the second order differential value ($d^2y/dx^2$) for the curve showing the relationship between the height from the optical axis and the sine condition unsatisfied amount is found, when the height from the optical axis of the ray of light passing the outmost peripheral portion of the common region is $h_0$, when $0.5h_0 < h < 0.8h_0$, then $(d^2y/dx^2) > 0$.  (8')

An objective optical element of the optical pick-up apparatus described in Item 13 is characterized in that: when the height from the optical axis is placed on the vertical line (x), and the sine condition unsatisfied amount when the first optical information recording medium is used, is placed on the horizontal line (y), and in the exclusive region, the differential value (dy/dx) for the curve showing the relationship between the height from the optical axis and the sine condition unsatisfied amount is found, when the straight line in which the differential value is an inclination at a certain height from the optical axis is drawn, at the further side from the optical axis than the certain height, the curve has an region existing in the more positive side than the straight line.

FIG. 3 is a view showing an example in which the height from the optical axis is placed on the vertical line (x), and the sine condition unsatisfied amount when the first optical information recording medium is used, is placed on the horizontal line (y), and in the common region and the exclusive region, the curve f1 showing the sine condition unsatisfied amount is found. Herein, at a certain height x2, when the straight line d2 in which the differential value is an inclination is drawn (which means that the tangential line is drawn on the curve f1 at a certain height x2), the curve f1 has an region R2 existing in the more positive side than the straight line (tangential line) d2 at the further side than the certain height x2. In this connection, between x2 and the region R2, it has also another region existing in the more negative side than the straight line d2. Because it has such a characteristic, the same effect as the invention described in Item 5 can be obtained.

An objective optical element of the optical pick-up apparatus described in Item 14 is characterized in that: in the case where the infinite objective distance ray of light whose height from the optical axis is h, is out-gone from the objective optical element when the first optical information recording medium is used, when the angle formed between the ray of light after the outgoing and the optical axis is expressed by U, and the sine condition unsatisfied amount is defined as SC1(h)=h/sin U−f (f: the focal length of the objective optical element when the first optical information recording medium is used), the sine condition unsatisfied amount in the exclusive region is monotonously increased as the height from the optical axis of the incident ray of light on the optical element is increased.

An objective optical element of the optical pick-up apparatus described in Item 15 is characterized in that: when the infinite objective distance ray of light whose height from the optical axis is h, is out-gone from the objective optical element, when the angle formed between the ray of light after the outgoing and the optical axis is expressed by U, and the sine condition unsatisfied amount is defined as SC1(h)=h/sin U−f (f: the focal length of the objective optical element when respective optical information recording media are used), in the common region, a sign of the sine condition unsatisfied amount which is the minimum when the first optical information recording medium is used and a sign of the sine condition unsatisfied amount which is the minimum when the second optical information recording medium is used, are negative.

An objective optical element of the optical pick-up apparatus described in Item 16 is characterized in that: in the case where the infinite objective distance ray of light whose height from the optical axis is h, is out-gone from the objective optical element, when the angle formed between the ray of light after the outgoing and the optical axis is expressed by U, and the sine condition unsatisfied amount is defined as SC1(h)=h/sin U−f (f: the focal length of the objective optical element when respective optical information recording media are used), when the maximum value of the sine condition unsatisfied amount absolute value in the common region when the first optical information recording medium is used, is $SC1_{max}$ and the maximum value of the sine condition unsatisfied amount absolute value in the common region when the second optical information recording medium is used, is $SC2_{max}$, it satisfies $0.003 \text{ mm} \leq SC1_{max} \leq 0.020 \text{ mm}$  (9)

$0.010 \text{ mm} \leq SC2_{max} \leq 0.040 \text{ mm}$.  (10)

An objective optical element of the optical pick-up apparatus described in Item 17 is characterized in that: in the case where the first optical information recording medium is used, when the height from the optical axis of the ray of light passing the outmost peripheral portion of the effective diameter of the objective optical element is hmax, the sine condition unsatisfied amount SC1 of the outmost peripheral ray of light satisfies $|SC1(h\text{max})| \leq 0.010 \text{ mm}$.  (11)

An objective optical element of the optical pick-up apparatus described in Item 18 is an objective optical element of the optical pick-up apparatus having: the first light source of the wavelength λ1 by which the recording or reproducing of the information is conducted by irradiating the light flux onto the first optical information recording medium whose transparent substrate thickness is t1; the second light source of the wavelength λ2 (λ1<λ2) by which the recording or reproducing of the information is conducted by irradiating the light flux onto the second optical information recording medium whose transparent substrate thickness is t2 (t1<t2); and the light converging optical system including the objective optical element by which the light fluxes out-gone from the first and the second light sources are converged onto the information recording surface through the transparent substrates of the first and the second optical information recording media, the objective optical element is characterized in that: it has an objective lens by which the light flux from the first or second light source is converged; and the optical function surface to give the optical action to the light flux, and the optical function surface of the objective optical element has the common region which includes the optical axis and is used for the recording and/or reproducing of the information for both of the first optical information recording medium and the second optical information recording medium, and the exclusive region which is provided outside of the common region, and is used for the recording and/or reproducing of the information for mainly the first optical information recording medium, and the objective optical element forms the spot diameter on the first optical information recording medium determined from the effective diameter and the focal length of the objective optical element, in the first optical information recording medium, and when the first optical information recording medium is used, when the infinite objective distance ray of light whose height form the optical axis is h, is out-gone from the objective optical element, the angle formed between the ray of light after the outgoing and the optical axis is expressed by U, and the sine condition unsatisfied amount is defined as SC1(h)=h/sin U−f (f: the focal length of the objective optical element when the first optical information recording medium is used), when the height from the optical axis of the ray of light passing the innermost peripheral portion of the exclusive region is $h_0$, the sine condition unsatisfied amount is $SC1_{out}(h_0)$ and the height from the optical axis of the ray of light passing the outmost peripheral portion of the effective diameter of the objective optical element is $h_{max}$, it satisfies $$SC1(h_0/2) \leq SC1_{out}(h_0) \quad (12)$$

$$SC1(h_0/2) \leq 0 \quad (13)$$

$$SC1(h_{max}) \geq 0. \quad (14)$$

The relationship of expressions (12)–(14) is clear from the example which will be described later, and when the sine condition unsatisfied amount is set in this manner, the same effect as the invention described in Item 1 in which the outside-axis coma can be balanced when each optical information recording medium is used, can be obtained.

An objective optical element of the optical pick-up apparatus described in Item 19 is characterized in that: in the case where the first optical information recording medium is used, when the infinite objective distance ray of light whose height from the optical axis is h, is out-gone from the objective optical element, the angle formed between the ray of light after the outgoing and the optical axis is expressed by U, and the sine condition unsatisfied amount is defined as $SC1(h)=h/\sin U-f$ (f: the focal length of the objective optical element when the first optical information recording medium is used), a sign of the sine condition unsatisfied amount of the ray of light passing the outermost peripheral portion of the common region is positive.

An objective optical element of the optical pick-up apparatus described in Item 20 is characterized in that: on the optical function surface of the objective optical element, it has the diffractive structure making the optical axis a center of rotation, and on the surface of the optical information recording medium side on the optical function surface, the common region used for the recording and/or reproducing of the information onto both of the first optical information recording medium and the second optical information recording medium including the optical axis, and the exclusive region which is provided outside the common region and is used for the recording and/or reproducing of the information mainly onto the first optical information recording medium, and a step difference portion which adjoins the common region and the exclusive region and which is almost parallel to the optical axis and facing outside to the optical axis, is provided.

FIG. 9 is a sectional view of the objective optical element (for example, objective lens) in which the step difference and the diffractive ring-shaped zone formed on the optical function surface of the optical information recording medium side are exaggeratedly shown. As shown in FIG. 9, a step difference portion T2 which adjoins the common region and the exclusive region, and which is almost parallel to the optical axis and which faces outside to the optical axis, is provided. When such a step difference portion is provided, as described relating to the invention described in Item 1, the outside-axis coma when each optical information recording medium is used, can be balanced. In this connection, when the diffractive structure D is provided at least one side (in this example, the light source side) of the common region and the exclusive region, as shown in FIG. 10, the step difference amount (d1, d2) of the step difference portion (T1, T2) is determined by the position of the mother aspheric surface, and the step difference amount of the diffractive structure provided on the mother aspheric surface.

An objective optical element of the optical pick-up apparatus described in Item 21 is characterized in that: a step difference amount d2 (refer to FIG. 9) of the step difference portion is:

$$0.000 \text{ mm} < d2 \leq 0.004 \text{ mm}. \quad (15)$$

An objective optical element of the optical pick-up apparatus described in Item 22 is the objective optical element of the optical pick-up apparatus having: the first light source of the wavelength λ1 by which the recording or reproducing of the information is conducted by irradiating the light flux onto the first optical information recording medium whose transparent substrate thickness is t1; the second light source of the wavelength λ2 (λ1<λ2) by which the recording or reproducing of the information is conducted by irradiating the light flux onto the second optical information recording medium whose transparent substrate thickness is t2 (t1<t2); and the light converging optical system including the objective optical element by which the light fluxes out-gone from the first and the second light sources are converged onto the information recording surface through the transparent substrates of the first and the second optical information recording media, the objective optical element is characterized in that: the objective optical element has: an objective lens to converge the light flux from the first light source or the second light source, and the optical function surface to give the optical action to the light flux; on the optical function surface of the optical information recording medium side of the objective optical element, the diffractive structure making the optical axis as a center of rotation is provided; on the optical function surface of the optical information recording medium side of the objective optical element, a common region which includes the optical axis, and is used for the recording and/or reproducing of the information onto both of the first optical information recording medium and the second optical information recording medium, and the exclusive region which is provided outside the common region and is used for the recording and/or reproducing of the information mainly onto the first optical information recording medium, and a step difference portion which adjoins the common region and the exclusive region, and which is almost parallel to the optical axis and faces outside to the optical axis, are provided; and the objective optical element forms the spot diameter on the first optical information recording medium determined from the effective diameter and the focal length of the objective optical element, in the first optical information recording medium.

According to the invention described in Item 22, because a step difference portion T2 which adjoins the common region and the exclusive region, and which is almost parallel to the optical axis and faces outside to the optical axis, is provided, as described relating to the invention described in Item 1, the outside-axis coma when each optical information recording medium is used can be balanced.

An objective optical element of the optical pick-up apparatus described in Item 23 is characterized in that: in the adjoining portion of the step difference portion in the common region and in the adjoining portion of the step difference portion in the exclusive region, a sign of the local curvature R(h) is different. In this connection, the expression of the local curvature R(h) will be described later.

An objective optical element of the optical pick-up apparatus described in Item 24 is characterized in that: in the adjoining portion of the step difference portion in the common region and in the adjoining portion of the step difference portion in the exclusive region, a sign of the local curvature R(h) is reversed from positive to negative.

An objective optical element of the optical pick-up apparatus described in Item 25 is characterized in that: on the optical function surface of the optical information recording medium side of the objective optical element, a common region which includes the optical axis, and is used for the recording and/or reproducing of the information onto both of the first optical information recording medium and the second optical information recording medium, and the exclusive region which is provided outside the common region and is used for the recording and/or reproducing of the information mainly onto the first optical information recording medium, and a step difference portion (T1 in FIG. 9) which adjoins the common region and the exclusive region, and which is almost parallel to the optical axis and faces inside to the optical axis, are provided.

An objective optical element of the optical pick-up apparatus described in Item 26 is characterized in that: a step difference amount d2 of the step difference portion (T2 in FIG. 9) on the optical function surface of the optical information recording medium side is:

$$0.000 \text{ mm} < d2 < 0.004 \text{ mm}. \tag{16}$$

An objective optical element of the optical pick-up apparatus described in Item 27 is characterized in that: a step difference amount dl of the step difference portion (T1 in FIG. 9) on the optical function surface of the light source side is:

$$0.000 \text{ mm} < d1 < 0.004 \text{ mm}. \tag{17}$$

An objective optical element of the optical pick-up apparatus described in Item 28 is characterized in that: in the common region of the light source side in the objective optical element, the diffractive structure (D in FIG. 9) making the optical axis as the center of rotation is formed.

An objective optical element of the optical pick-up apparatus described in Item 29 is characterized in that: when the first optical information recording medium and the second optical information recording medium are used, the image formation magnification by the objective optical element single body is almost infinite magnification.

An objective optical element of the optical pick-up apparatus described in Item 30 is characterized in that: when the first optical information recording medium and the second optical information recording medium are used, the magnification m of the optical system from the light source to the optical information recording medium is respectively $-\frac{1}{5} \leq m \leq -\frac{1}{10}$. When the value m is not smaller than the lower limit value, the position dislocation amount on the recording surface of each optical information recording medium to the position dislocation of the light source is not so large, and the error factor can be reduced, and when the value m is not larger than the upper limit value, the optical path length is not too long, and the optical pick-up apparatus can be compact.

An objective optical element of the optical pick-up apparatus described in Item 31 is characterized in that: when the first optical information recording medium is used, because the image formation magnification by the objective optical element single body is different from the image formation magnification by the objective optical element single body when the second optical information recording medium is used, for example, when the first optical information recording medium is used, the infinite light flux is incident on the objective optical element, and when the second optical information recording medium is used, the finite divergent light flux can be incident on the objective optical element, thereby, the difference of the working distance to dislocate the objective optical element in the optical axis direction can be reduced, and the optical pick-up apparatus can be compact, and the power saving can be intended.

An objective optical element of the optical pick-up apparatus described in Item 32 is characterized in that: the light flux out-gone from the first light source is incident on the objective optical element as the infinite light flux, and the light flux out-gone from the second light source is incident on the objective optical element as the finite light flux.

An objective optical element of the optical pick-up apparatus described in Item 33 can provide an objective optical element appropriate for the optical pick-up apparatus because the focal length f of the objective optical element is:

$$1.0 \text{ mm} \leq f \leq 4.0 \text{ mm}.$$

An objective optical element of the optical pick-up apparatus described in Item 34 can provide an objective optical element appropriate for the optical pick-up apparatus because the focal length f of the objective optical element is:

$$1.5 \text{ mm} \leq f \leq 3.5 \text{ mm},$$

the transparent substrate thickness t1 of the first optical information recording medium is a half of the transparent substrate thickness t2 of the second optical information recording medium ($2 \times t1 \approx t2$), and when the required numerical aperture when the first optical information recording medium is used, is NA1, and the required numerical aperture when the second optical information recording medium is used, is NA2, it satisfies:

$$0.59 \leq NA1 \leq 0.68 \text{ and } 0.43 \leq NA2 \leq 0.58 \tag{18},$$

the objective optical element appropriate for the interchangeable optical pick-up apparatus by which, for example, DVD or CD can be used, can be provided.

An objective optical element of the optical pick-up apparatus described in Item 35 can provide an objective optical element in which the aberration characteristic is good because the respective coma in the angle of view 1° is suppressed under 0.05 λ rms.

An objective optical element of the optical pick-up apparatus described in Item 36 can solve or soften the problem of the coma due to the shift from the optical axis of any light source when it is used for the optical pick-up apparatus using the light source (for example, 2 laser 1 package module) in which the light source for the first optical information recording medium and the light source for the second optical information recording medium are unitized.

An optical pick-up apparatus described in Item 37 is an optical pick-up apparatus having: the first light source of the wavelength λ1 by which the recording or reproducing of the information is conducted by irradiating the light flux onto the first optical information recording medium whose transparent substrate thickness is t1; the second light source of the wavelength λ2 (λ1<λ2) by which the recording or reproducing of the information is conducted by irradiating the light flux onto the second optical information recording medium whose transparent substrate thickness is t2 (t1<t2); and the light converging optical system including the objective optical element by which the light fluxes out-gone from the first and the second light sources are converged onto the information recording surface through the transparent substrates of the first and the second optical information recording media, the objective optical element has: an objective lens to converge the light flux from the first light source or the second light source, and the optical function surface to give the optical action to the light flux; the optical function surface of the objective optical element has a common region which includes the optical axis, and is used for the recording and/or reproducing of the information onto both of the first optical information recording medium and the second optical information recording medium, and the exclusive region which is provided outside the common region and is used for the recording and/or reproducing of the information mainly onto the first optical information recording medium, and the objective optical element forms the spot diameter on the first optical information recording medium determined by the effective diameter and the focal length of the objective optical element, in the first optical information recording medium, when the second optical information recording medium is used, and when the first optical information recording medium is used, a case where the sine condition unsatisfied amount is maximum exists in the common region, and when the coma generated when the light flux is obliquely incident on the objective optical element at the angle of view 1° is COMA1 (λ1 rms), and the coma generated when the light flux is obliquely incident on the objective optical element at the angle of view 1° is COMA2 (λ2 rms) when the second optical information recording medium is used, because it satisfies:

$$0.5 \leq COMA2/COMA1 \leq 1.0 \quad (1),$$

the same effect as the invention described in Item 1 can be attained.

An optical pick-up apparatus described in Item 38 is an optical pick-up apparatus having: the first light source of the wavelength λ1 by which the recording or reproducing of the information is conducted by irradiating the light flux onto the first optical information recording medium whose transparent substrate thickness is t1; the second light source of the wavelength λ2 (λ1<λ2) by which the recording or reproducing of the information is conducted by irradiating the light flux onto the second optical information recording medium whose transparent substrate thickness is t2 (t1<t2); and the light converging optical system including the objective optical element by which the light fluxes out-gone from the first and the second light sources are converged onto the information recording surface through the transparent substrates of the first and the second optical information recording media, the objective optical element has: an objective lens to converge the light flux from the first light source or the second light source, and the optical function surface to give the optical action to the light flux; the optical function surface of the objective optical element has a common region which includes the optical axis, and is used for the recording and/or reproducing of the information onto both of the first optical information recording medium and the second optical information recording medium, and the exclusive region which is provided outside the common region and is used for the recording and/or reproducing of the information mainly onto the first optical information recording medium, and the objective optical element forms the spot diameter on the first optical information recording medium determined by the effective diameter and the focal length of the objective optical element, in the first optical information recording medium, and when the infinite objective distance ray of light whose height from the optical axis is h, is out-gone from the objective optical element, when the angle formed between the ray of light after the outgoing and the optical axis is expressed by U, and the sine condition unsatisfied amount is defined as SC(h)=h/sin U−f (f: the focal length of the objective optical element when respective information recording media are used), because, in the common region, a sign of the sine condition unsatisfied amount which is minimum when the first optical information recording medium is used, and a sign of the sine condition unsatisfied amount which is minimum when the second optical information recording medium is used, are negative, the same effect as the invention described in Item 2 can be attained.

An optical pick-up apparatus described in Item 39 is characterized in that: in the case where the infinite objective distance ray of light whose height from the optical axis is h, is out-gone from the objective optical element, when the angle formed between the ray of light after the outgoing and the optical axis is expressed by U, and the sine condition unsatisfied amount is defined as SC(h)=h/sin U−f (f: the focal length of the objective optical element when respective information recording media are used), when the maximum value of the sine condition unsatisfied amount absolute value in the common region is SC1max when the first optical information recording medium is used, and the maximum value of the sine condition unsatisfied amount absolute value in the common region is SC2max when the second optical information recording medium is used, it satisfies $$0.003 \text{ mm} \leq SC1\text{max} \leq 0.020 \text{ mm} \quad (2)$$

$$0.010 \text{ mm} \leq SC2\text{max} \leq 0.040 \text{ mm} \quad (3).$$

An optical pick-up apparatus described in Item 40 is characterized in that: in the case where the first optical information recording medium is used, when the height from the optical axis of the ray of light passing the outmost peripheral portion of the effective diameter of the objective optical element, is hmax, the sine condition unsatisfied amount SC1 of the outmost peripheral ray of light satisfies $$|SC1(h\text{max})| \leq 0.010 \text{ mm} \quad (4).$$

An optical pick-up apparatus described in Item 41 is characterized in that: in the case where the infinite objective distance ray of light whose height from the optical axis is h, is out-gone from the objective optical element, when the angle formed between the ray of light after the outgoing and the optical axis is expressed by U, and the sine condition unsatisfied amount is defined as SC(h)=h/sin U−f (f: the focal length of the objective optical element when respective information recording media are used), a sign of the sine condition unsatisfied amount in which the sine condition unsatisfied amount absolute value in the common region is maximum, is negative.

An optical pick-up apparatus described in Item 42 is characterized in that: in the case where the infinite objective distance ray of light whose height from the optical axis is h, is out-gone from the objective optical element, when the angle formed between the ray of light after the outgoing and the optical axis is expressed by U, and the sine condition unsatisfied amount is defined as SC(h)=h/sin U−f (f: the focal length of the objective optical element when respective information recording media are used), when the minimum value of the sine condition unsatisfied amount in the common region when the first optical information recording medium is used, is SC1 Dmin, and the minimum value of the sine condition unsatisfied amount in the exclusive region is SC1smin, $$1.2 \cdot SC1D\text{min} \leq SC1s\text{min} \quad (5).$$

An optical pick-up apparatus described in Item 43 is characterized in that: in the case where the infinite objective distance ray of light whose height from the optical axis is h, is out-gone from the objective optical element, when the angle formed between the ray of light after the outgoing and the optical axis is expressed by U, and the sine condition unsatisfied amount is defined as SC(h)=h/sin U−f (f: the focal length of the objective optical element when respective information recording media are used), the sine condition unsatisfied amount when the first optical information recording medium is used, is discontinuous toward the negative (−) side at the portion at which it is switched from the common region to the exclusive region.

An optical pick-up apparatus described in Item 44 is characterized in that: in the case where the infinite objective distance ray of light whose height from the optical axis is h, is out-gone from the objective optical element, when the angle formed between the ray of light after the outgoing and the optical axis is expressed by U, and the sine condition unsatisfied amount is defined as SC(h)=h/sin U−f (f: the focal length of the objective optical element when respective information recording media are used), a sign of the sine condition unsatisfied amount in which the sine condition unsatisfied amount is maximum in the common region, is positive.

An optical pick-up apparatus described in Item 45 is characterized in that: in the case where the infinite objective distance ray of light whose height from the optical axis is h, is out-gone from the objective optical element when the first optical information recording medium is used, when the angle formed between the ray of light after the outgoing and the optical axis is expressed by U, and the sine condition unsatisfied amount is defined as SC(h)=h/sin U−f (f: the focal length of the objective optical element when first information recording medium is used), when the sine condition unsatisfied amount of the ray of light passing the innermost peripheral portion of the exclusive region is SC1 out ($h_0$), and the minimum value of the sine condition unsatisfied amount in the common region is $SC1_{Dmin}$, $$1.2 \cdot SC1_{Dmin} \leq SC1_{out}(h_0) \qquad (6).$$

An optical pick-up apparatus described in Item 46 is characterized in that: when the first optical information recording medium is used, a case where the absolute value of the sine condition unsatisfied amount is maximum exists in the common region, and when the coma generated when the light flux is obliquely incident on the objective optical element at the angle of view 1° when the first optical information recording medium is used, is COMA1 (λ1 rms), and the coma generated when the light flux is obliquely incident on the objective optical element at the angle of view 1° when the second optical information recording medium is used, is COMA2 (λ2 rms), it satisfies $$0.5 \leq COMA1/COMA2 \leq 1.0 \qquad (7).$$

An optical pick-up apparatus described in Item 47 is an optical pick-up apparatus having: the first light source of the wavelength λ1 by which the recording or reproducing of the information is conducted by irradiating the light flux onto the first optical information recording medium whose transparent substrate thickness is t1; the second light source of the wavelength λ2 (λ1<λ2) by which the recording or reproducing of the information is conducted by irradiating the light flux onto the second optical information recording medium whose transparent substrate thickness is t2 (t1<t2); and the light converging optical system including the objective optical element by which the light fluxes out-gone from the first and the second light sources are converged onto the information recording surface through the transparent substrates of the first and the second optical information recording media, the objective optical element has: an objective lens to converge the light flux from the first light source or the second light source, and the optical function surface to give the optical action to the light flux; the optical function surface of the objective optical element has a common region which includes the optical axis, and is used for the recording and/or reproducing of the information onto both of the first optical information recording medium and the second optical information recording medium, and the exclusive region which is provided outside the common region and is used for the recording and/or reproducing of the information mainly onto the first optical information recording medium, and the objective optical element forms the spot diameter on the first optical information recording medium determined by the effective diameter and the focal length of the objective optical element, in the first optical information recording medium, and the height from the optical axis is placed on the vertical line (x) and the sine condition unsatisfied amount when the second optical information recording medium is used, is placed on the horizontal line (y), and in the common region, when the differential value (dy/dx) relating to the curve showing the relationship between the height from the optical axis and the sine condition unsatisfied amount is found, in the case where the second optical information recording medium is used, when the height from the optical axis of the ray of light passing the outmost peripheral portion of the effective diameter of the objective optical element is hCDNA, $$\text{when } h<0.6 \, hCDNA, \text{ then } (dy/dx) \leq 0 \qquad (8),$$

and when the straight line whose differential value is an inclination is drawn at the first height from the optical axis, because, at the further side from the optical axis than the first height, the curve has an region existing in more the positive side than the straight line, the same effect as the invention described in Item 11 can be attained.

An optical pick-up apparatus described in Item 48 is characterized in that: when the first optical information recording medium is used, the curve showing the sine condition unsatisfied amount in the common region is, when the height from the optical axis is placed on the vertical line (x) and the sine condition unsatisfied amount when the second optical information recording medium is used, is placed on the horizontal line (y), and the second order differential value ($d^2y/dx^2$) for the curve showing the relationship between the height from the optical axis and the sine condition unsatisfied amount is found, when the height from the optical axis of the ray of light passing the outmost peripheral portion of the common region is $h_0$, $$\text{when } 0.5h_0<h<0.8h_0, \text{ then } (d^2y/dx^2)>0. \qquad (8')$$

An optical pick-up apparatus described in Item 49 is characterized in that: when the height from the optical axis is placed on the vertical line (x), and the sine condition unsatisfied amount when the first optical information recording medium is used, is placed on the horizontal line (y), and in the exclusive region, the differential value (dy/dx) for the curve showing the relationship between the height from the optical axis and the sine condition unsatisfied amount is found, when the straight line in which the differential value is an inclination at a certain height from the optical axis is drawn, at the further side from the optical axis than the certain height, the curve has an region existing in the more positive side than the straight line.

An optical pick-up apparatus described in Item 50 is characterized in that: in the case where the infinite objective distance ray of light whose height from the optical axis is h, is out-gone from the objective optical element when the first optical information recording medium is used, when the angle formed between the ray of light after the outgoing and the optical axis is expressed by U, and the sine condition unsatisfied amount is defined as SC1(h)=h/sin U−f (f: the focal length of the objective optical element when the first optical information recording medium is used), the sine condition unsatisfied amount in the exclusive region is monotonously increased as the height from the optical axis of the incident ray of light on the optical element is increased.

An optical pick-up apparatus described in Item 51 is characterized in that: in the case where the infinite objective distance ray of light whose height from the optical axis is h, is out-gone from the objective optical element, when the angle formed between the ray of light after the outgoing and the optical axis is expressed by U, and the sine condition unsatisfied amount is defined as SC1(h)=h/sin U−f (f: the focal length of the objective optical element when respective optical information recording media are used), in the common region, a sign of the sine condition unsatisfied amount which is the minimum when the first optical information recording medium is used and a sign of the sine condition unsatisfied amount which is the minimum when the second optical information recording medium is used, are negative.

An optical pick-up apparatus described in Item 52 is characterized in that: in the case where the infinite objective distance ray of light whose height from the optical axis is h, is out-gone from the objective optical element, when the angle formed between the ray of light after the outgoing and the optical axis is expressed by U, and the sine condition unsatisfied amount is defined as SC1(h)=h/sin U−f (f: the focal length of the objective optical element when respective optical information recording media are used), when the maximum value of the sine condition unsatisfied amount absolute value in the common region when the first optical information recording medium is used, is $SC1_{max}$ and the maximum value of the sine condition unsatisfied amount absolute value in the common region when the second optical information recording medium is used, is $SC2_{max}$, it satisfies $$0.003 \text{ mm} \leq SC1_{max} \leq 0.020 \text{ mm} \tag{9}$$

$$0.010 \text{ mm} \leq SC2_{max} \leq 0.040 \text{ mm}. \tag{10}$$

An optical pick-up apparatus described in Item 53 is characterized in that: in the case where the first optical information recording medium is used, when the height from the optical axis of the ray of light passing the outmost peripheral portion of the effective diameter of the objective optical element is hmax, the sine condition unsatisfied amount SC1 of the outmost peripheral ray of light satisfies $$|SC1(h\text{max})| \leq 0.010 \text{ mm}. \tag{11}$$

An optical pick-up apparatus described in Item 54 is an optical pick-up apparatus having: the first light source of the wavelength λ1 by which the recording or reproducing of the information is conducted by irradiating the light flux onto the first optical information recording medium whose transparent substrate thickness is t1; the second light source of the wavelength λ2 (λ1<λ2) by which the recording or reproducing of the information is conducted by irradiating the light flux onto the second optical information recording medium whose transparent substrate thickness is t2 (t1<t2); and the light converging optical system including the objective optical element by which the light fluxes out-gone from the first and the second light sources are converged onto the information recording surface through the transparent substrates of the first and the second optical information recording media, and the objective optical element has: an objective lens by which the light flux from the first or second light source is converged; and the optical function surface to give the optical action to the light flux, and the optical function surface of the objective optical element has the common region which includes the optical axis and is used for the recording and/or reproducing of the information for both of the first optical information recording medium and the second optical information recording medium, and the exclusive region which is provided outside of the common region, and is used for the recording and/or reproducing of the information for mainly onto the first optical information recording medium, and the objective optical element forms the spot diameter on the first optical information recording medium determined from the effective diameter and the focal length of the objective optical element, in the first optical information recording medium, and when the first optical information recording medium is used, when the infinite objective distance ray of light whose height form the optical axis is h, is out-gone from the objective optical element, the angle formed between the ray of light after the outgoing and the optical axis is expressed by U, and the sine condition unsatisfied amount is defined as SC1(h)=h/sin U−f (f: the focal length of the objective optical element when the first optical information recording medium is used), when the height from the optical axis of the ray of light passing the innermost peripheral portion of the exclusive region is $h_0$, the sine condition unsatisfied amount is $SC1_{out}(h_0)$, and the height from the optical axis of the ray of light passing the outmost peripheral portion of the effective diameter of the objective optical element is $h_{max}$, because it satisfies $$SC1(h_0/2) \leq SC1_{out}(h_0) \tag{12}$$

$$SC1(h_0/2) \leq 0 \tag{13}$$

$$SC1(h_{max}) \geq 0 \tag{14},$$

the same effect as the invention described in Item 18 can be attained.

An optical pick-up apparatus described in Item 55 is characterized in that: in the case where the first optical information recording medium is used, when the infinite objective distance ray of light whose height form the optical axis is h, is out-gone from the objective optical element, the angle formed between the ray of light after the outgoing and the optical axis is expressed by U, and the sine condition unsatisfied amount is defined as SC1(h)=h/sin U−f (f: the focal length of the objective optical element when the first optical information recording medium is used), a sign of the sine condition unsatisfied amount of the ray of light passing the outmost peripheral portion of the common region is positive.

An optical pick-up apparatus described in Item 56 is characterized in that: on the optical function surface of the objective optical element, it has the diffractive structure making the optical axis a center of rotation, and on the surface of the optical information recording medium side, the common region used for the recording and/or reproducing of the information onto both of the first optical information recording medium and the second optical information recording medium including the optical axis, and the exclusive region which is provided outside the common region and is used for the recording and/or reproducing of the information mainly onto the first optical information recording medium, and a step difference portion which adjoins the common region and the exclusive region and which is almost parallel to the optical axis and facing outside to the optical axis, is provided.

An optical pick-up apparatus described in Item 57 is characterized in that: a step difference amount d2 of the step difference portion is:

$$0.000 \text{ mm} < d2 \leq 0.004 \text{ mm}. \tag{15}$$

An optical pick-up apparatus described in Item 58 is the optical pick-up apparatus having: the first light source of the wavelength λ1 by which the recording or reproducing of the information is conducted by irradiating the light flux onto the first optical information recording medium whose transparent substrate thickness is t1; the second light source of the wavelength λ2 (λ1<λ2) by which the recording or reproducing of the information is conducted by irradiating the light flux onto the second optical information recording medium whose transparent substrate thickness is t2 (t1<t2); and the light converging optical system including the objective optical element by which the light fluxes out-gone from the first and the second light sources are converged onto the information recording surface through the transparent substrates of the first and the second optical information recording media, and the objective optical element has: an objective lens to converge the light flux from the first light source or the second light source, and the optical function surface to give the optical action to the light flux; on the optical function surface of the light source side of the objective optical element, the diffractive structure making the optical axis as a center of rotation is provided; on the optical function surface of the optical information recording medium side of the objective optical element, a common region which includes the optical axis, and is used for the recording and/or reproducing of the information onto both of the first optical information recording medium and the second optical information recording medium, and the exclusive region which is provided outside the common region and is used for the recording and/or reproducing of the information mainly onto the first optical information recording medium, and a step difference portion which adjoins the common region and the exclusive region, and which is almost parallel to the optical axis and faces outside to the optical axis, are provided; and because the objective optical element forms the spot diameter on the first optical information recording medium determined from the effective diameter and the focal length of the objective optical element, in the first optical information recording medium, the same effect as the invention described in Item 22 can be attained.

An optical pick-up apparatus described in Item 59 is characterized in that: at the adjoining portion to the step difference portion in the common region of the objective optical element and at the adjoining portion to the step difference portion in the exclusive region, a sign of the local curvature R(h) is different.

An optical pick-up apparatus described in Item 60 is characterized in that: at the adjoining portion to the step difference portion in the common region of the objective optical element and at the adjoining portion to the step difference portion in the exclusive region, a sign of the local curvature R(h) is reversed from the positive to the negative.

An optical pick-up apparatus described in Item 61 is characterized in that: on the optical function surface of the light source side of the objective optical element, a common region which includes the optical axis, and is used for the recording and/or reproducing of the information onto both of the first optical information recording medium and the second optical information recording medium; the exclusive region which is provided outside the common region and is used for the recording and/or reproducing of the information mainly onto the first optical information recording medium; and a step difference portion which adjoins the common region and the exclusive region, and which is almost parallel to the optical axis and faces inside to the optical axis, are provided.

An optical pick-up apparatus described in Item 62 is characterized in that: a step difference amount d2 of the step difference portion on the optical function surface of the optical information recording medium side is $$0.000 \text{ mm} < d2 < 0.004 \text{ mm}. \tag{16}$$

An optical pick-up apparatus described in Item 63 is characterized in that: a step difference amount d1 of the step difference portion on the optical function surface of the light source side is $$0.000 \text{ mm} < d1 < 0.004 \text{ mm}. \tag{17}$$

An optical pick-up apparatus described in Item 64 is characterized in that: in the common region of the light source side in the objective optical element, a diffractive structure in which the optical axis is made a center of rotation is formed.

An optical pick-up apparatus described in Item 65 is characterized in that: when the first optical information recording medium and the second optical information recording medium are used, respectively, the image formation magnification by the objective optical element single body is almost infinite magnification.

An optical pick-up apparatus described in Item 66 is characterized in that: the magnification m of the optical system from the light source to the optical information recording medium is, when the first optical information recording medium and the second optical information recording medium are used, respectively, $-\frac{1}{5} \leq m \leq -\frac{1}{10}$.

An optical pick-up apparatus described in Item 67 is characterized in that: the image formation magnification by the objective optical element single body when the first optical information recording medium is used, is different from the image formation magnification by the objective optical element single body when the second optical information recording medium is used.

An objective optical element of the optical pick-up apparatus described in Item 68 is characterized in that: the light flux out-gone from the first light source is incident on the objective optical element as the infinite light flux, and the light flux out-gone from the second light source is incident on the objective optical element as the finite light flux.

An optical pick-up apparatus described in Item 69 is characterized in that: the focal length f of the objective optical element is 1.0 mm $\leq f \leq$ 4.0 mm.

An optical pick-up apparatus described in Item 70 is characterized in that: when the focal length f of the objective optical element is 1.5 mm $\leq f \leq$ 3.5 mm, the transparent substrate thickness t1 of the first optical information recording medium is a half of the transparent substrate thickness t2 of the second optical information recording medium (2×t1 ≈t2), the required numerical aperture when the first optical information recording medium is used, is NA1, and the required numerical aperture when the second optical information recording medium is used, is NA2, it satisfies $$0.59 \leq NA1 \leq 0.68 \text{ and } 0.43 \leq NA2 \leq 0.58 \tag{18}$$

An optical pick-up apparatus described in Item 71 is characterized in that: the respective comas at the angle of view 1° are, respectively, suppressed not larger than 0.05 λ rms.

An optical pick-up apparatus described in Item 72 is characterized in that: it is an optical pick-up apparatus using a light source, in which the light source for the first optical information recording medium and the light source for the first optical information recording medium are unitized.

An optical information recording reproducing apparatus described in Item 73 is an optical information recording reproducing apparatus having: the first light source of the wavelength λ1 by which the recording or reproducing of the information is conducted by irradiating the light flux onto the first optical information recording medium whose transparent substrate thickness is t1; the second light source of the wavelength λ2 (λ1<λ2) by which the recording or reproducing of the information is conducted by irradiating the light flux onto the second optical information recording medium whose transparent substrate thickness is t2 (t1<t2); and the light converging optical system including the objective optical element by which the light fluxes out-gone from the first and the second light sources are converged onto the information recording surface through the transparent substrates of the first and the second optical information recording media, and the objective optical element has: an objective lens to converge the light flux from the first light source or the second light source, and the optical function surface to give the optical action to the light flux; the optical function surface of the objective optical element has a common region which includes the optical axis, and is used for the recording and/or reproducing of the information onto both of the first optical information recording medium and the second optical information recording medium, and the exclusive region which is provided outside the common region and is used for the recording and/or reproducing of the information mainly onto the first optical information recording medium, and the objective optical element forms the spot diameter on the first optical information recording medium determined by the effective diameter and the focal length of the objective optical element, in the first optical information recording medium, and when the first optical information recording medium is used, a case where the sine condition unsatisfied amount is maximum exists in the common region, and when the coma generated when the light flux is obliquely incident on the objective optical element at the angle of view 1° when the first optical information recording medium is used, is COMA1 (λ1 rms), and the coma generated when the light flux is obliquely incident on the objective optical element at the angle of view 1° is COMA2 (λ2 rms) when the second optical information recording medium is used, because it satisfies $$0.5 \leq COMA2/COMA1 \leq 1.0 \quad (1),$$

the same effect as the invention described in Item 1 can be attained.

An optical information recording reproducing apparatus described in Item 73 is an optical information recording reproducing apparatus having: the first light source of the wavelength λ1 by which the recording or reproducing of the information is conducted by irradiating the light flux onto the first optical information recording medium whose transparent substrate thickness is t1; the second light source of the wavelength λ2 (λ1<λ2) by which the recording or reproducing of the information is conducted by irradiating the light flux onto the second optical information recording medium whose transparent substrate thickness is t2 (t1<t2); and the light converging optical system including the objective optical element by which the light fluxes out-gone from the first and the second light sources are converged onto the information recording surface through the transparent substrates of the first and the second optical information recording media, and the objective optical element has: an objective lens to converge the light flux from the first light source or the second light source, and the optical function surface to give the optical action to the light flux; the optical function surface of the objective optical element has a common region which includes the optical axis, and is used for the recording and/or reproducing of the information onto both of the first optical information recording medium and the second optical information recording medium, and the exclusive region which is provided outside the common region and is used for the recording and/or reproducing of the information mainly onto the first optical information recording medium, and the objective optical element forms the spot diameter on the first optical information recording medium determined by the effective diameter and the focal length of the objective optical element, in the first optical information recording medium, and in the case where the infinite objective distance ray of light whose height from the optical axis is h, is out-gone from the objective optical element, when the angle formed between the ray of light after the outgoing and the optical axis is expressed by U, and the sine condition unsatisfied amount is defined as SC(h)=h/sin U−f (f: the focal length of the objective optical element when respective information recording media are used), because a sign of the sine condition unsatisfied amount which is minimum when the first optical information recording medium is used, in the common region, and a sign of the sine condition unsatisfied amount which is minimum when the second optical information recording medium is used, are negative, the same effect as the invention described in Item 2 can be attained.

An optical information recording reproducing apparatus described in Item 75 is characterized in that: in the case where the infinite objective distance ray of light whose height from the optical axis is h, is out-gone from the objective optical element, when the angle formed between the ray of light after the outgoing and the optical axis is expressed by U, and the sine condition unsatisfied amount is defined as SC1(h)=h/sin U−f (f: the focal length of the objective optical element when respective optical information recording media are used), when the maximum value of the sine condition unsatisfied amount absolute value in the common region when the first optical information recording medium is used, is $SC1_{max}$ and the maximum value of the sine condition unsatisfied amount absolute value in the common region when the second optical information recording medium is used, is $SC2_{max}$, it satisfies $$0.003 \text{ mm} \leq SC1_{max} \leq 0.020 \text{ mm} \quad (2)$$

$$0.010 \text{ mm} \leq SC2_{max} \leq 0.040 \text{ mm}. \quad (3)$$

An optical information recording reproducing apparatus described in Item 76 is characterized in that: in the case where the first optical information recording medium is used, when the height from the optical axis of the ray of light passing the outmost peripheral portion of the effective diameter of the objective optical element is hmax, the sine condition unsatisfied amount SC1 of the outmost peripheral ray of light satisfies $$|SC1(h\text{max})| \leq 0.010 \text{ mm}. \quad (4).$$

An optical information recording reproducing apparatus described in Item 77 is characterized in that: in the case where the infinite objective distance ray of light whose height from the optical axis is h, is out-gone from the objective optical element, when the angle formed between the ray of light after the outgoing and the optical axis is expressed by U, and the sine condition unsatisfied amount is defined as SC(h)=h/sin U−f (f: the focal length of the objective optical element when respective information recording media are used), a sign of the sine condition unsatisfied amount in which the sine condition unsatisfied amount absolute value in the common region is maximum, is negative.

An optical information recording reproducing apparatus described in Item 78 is characterized in that: in the case where the infinite objective distance ray of light whose height from the optical axis is h, is out-gone from the objective optical element, when the angle formed between the ray of light after the outgoing and the optical axis is expressed by U, and the sine condition unsatisfied amount is defined as SC(h)=h/sin U−f (f: the focal length of the objective optical element when respective information recording media are used), when the minimum value of the sine condition unsatisfied amount in the common region when the first optical information recording medium is used, is $SC1_{Dmin}$, and the minimum value of the sine condition unsatisfied amount in the exclusive region is $SC1_{smin}$, $$1.2 \cdot SC1_{Dmin} \leq SC1_{smin} \quad (5).$$

An optical information recording reproducing apparatus described in Item 79 is characterized in that: in the case where the infinite objective distance ray of light whose height from the optical axis is h, is out-gone from the objective optical element, when the angle formed between the ray of light after the outgoing and the optical axis is expressed by U, and the sine condition unsatisfied amount is defined as SC(h)=h/sin U−f (f: the focal length of the objective optical element when respective information recording media are used), the sine condition unsatisfied amount when the first optical information recording medium is used, is discontinuous toward the negative (−) side at the portion at which it is switched from the common region to the exclusive region.

An optical information recording reproducing apparatus described in Item 80 is characterized in that: in the case where the infinite objective distance ray of light whose height from the optical axis is h, is out-gone from the objective optical element, when the angle formed between the ray of light after the outgoing and the optical axis is expressed by U, and the sine condition unsatisfied amount is defined as SC(h)=h/sin U−f (f: the focal length of the objective optical element when respective information recording media are used), a sign of the sine condition unsatisfied amount in which the sine condition unsatisfied amount is maximum in the common region, is positive.

An optical information recording reproducing apparatus described in Item 81 is characterized in that: in the case where the infinite objective distance ray of light whose height from the optical axis is h, is out-gone from the objective optical element when the first optical information recording medium is used, when the angle formed between the ray of light after the outgoing and the optical axis is expressed by U, and the sine condition unsatisfied amount is defined as SC(h)=h/sin U−f (f: the focal length of the objective optical element when first information recording medium is used), when the sine condition unsatisfied amount of the ray of light passing the innermost peripheral portion of the exclusive region is $SC1_{out}(h_0)$, and the minimum value of the sine condition unsatisfied amount in the common region is $SC1_{Dmin}$, $$1.2 \cdot SC1_{Dmin} \leq SC1_{out}(h_0) \tag{6}$$

An optical information recording reproducing apparatus described in Item 82 is characterized in that: when the first optical information recording medium is used, a case where the absolute value of the sine condition unsatisfied amount is maximum exists in the common region, and when the coma generated when the light flux is obliquely incident on the objective optical element at the angle of view 1° when the first optical information recording medium is used, is COMA1 (λ1 rms), and the coma generated when the light flux is obliquely incident on the objective optical element at the angle of view 1° when the second optical information recording medium is used, is COMA2 (λ2 rms), it satisfies $$0.5 \leq COMA1/COMA2 \leq 1.0 \tag{7}$$

An optical information recording reproducing apparatus described in Item 83 is an optical information recording reproducing apparatus having: the first light source of the wavelength λ1 by which the recording or reproducing of the information is conducted by irradiating the light flux onto the first optical information recording medium whose transparent substrate thickness is t1; the second light source of the wavelength λ2 (λ1<λ2) by which the recording or reproducing of the information is conducted by irradiating the light flux onto the second optical information recording medium whose transparent substrate thickness is t2 (t1<t2); and the light converging optical system including the objective optical element by which the light fluxes out-gone from the first and the second light sources are converged onto the information recording surface through the transparent substrates of the first and the second optical information recording media, the objective optical element has: an objective lens to converge the light flux from the first light source or the second light source, and the optical function surface to give the optical action to the light flux; the optical function surface of the objective optical element has a common region which includes the optical axis, and is used for the recording and/or reproducing of the information onto both of the first optical information recording medium and the second optical information recording medium, and the exclusive region which is provided outside the common region and is used for the recording and/or reproducing of the information mainly onto the first optical information recording medium, and the objective optical element forms the spot diameter on the first optical information recording medium determined by the effective diameter and the focal length of the objective optical element, in the first optical information recording medium, and the height from the optical axis is placed on the vertical line (x) and the sine condition unsatisfied amount when the second optical information recording medium is used, is placed on the horizontal line (y), and in the common region, when the differential value (dy/dx) relating to the curve showing the relationship between the height from the optical axis and the sine condition unsatisfied amount is found, in the case where the second optical information recording medium is used, when the height from the optical axis of the ray of light passing the outmost peripheral portion of the effective diameter of the objective optical element is hCDNA, when h<0.6 hCDNA, then (dy/dx)≦0 (8), and when the straight line whose differential value is an inclination is drawn at the first height from the optical axis, because, at the further side from the optical axis than the first height, the curve has an region existing in more the positive side than the straight line, the same effect as the invention described in Item 11 can be attained.

An optical information recording reproducing apparatus described in Item 84 is characterized in that: when the first optical information recording medium is used, the curve showing the sine condition unsatisfied amount in the common region is, when the height from the optical axis is placed on the vertical line (x) and the sine condition unsatisfied amount when the second optical information recording medium is used, is placed on the horizontal line (y), and the second order differential value $(d^2y/dx^2)$ for the curve showing the relationship between the height from the optical axis and the sine condition unsatisfied amount is found, when the height from the optical axis of the ray of light passing the outmost peripheral portion of the common region is $h_0$, $$\text{when } 0.5\ h_0 < h < 0.8 h_0, \text{ then } (d^2y/dx^2) > 0. \tag{8'}$$

An optical information recording reproducing apparatus described in Item 85 is characterized in that: when the height from the optical axis is placed on the vertical line (x), and the sine condition unsatisfied amount when the first optical information recording medium is used, is placed on the horizontal line (y), and in the exclusive region, the differential value (dy/dx) for the curve showing the relationship between the height from the optical axis and the sine condition unsatisfied amount is found, when the straight line in which the differential value is an inclination at a certain height from the optical axis is drawn, at the further side from the optical axis than the certain height, the curve has an region existing in the more positive side than the straight line.

An optical information recording reproducing apparatus described in Item 86 is characterized in that: in the case where the infinite objective distance ray of light whose height from the optical axis is h, is out-gone from the objective optical element when the first optical information recording medium is used, when the angle formed between the ray of light after the outgoing and the optical axis is expressed by U, and the sine condition unsatisfied amount is defined as SC1(h)=h/sin U−f (f: the focal length of the objective optical element when the first optical information recording medium is used), the sine condition unsatisfied amount in the exclusive region is monotonously increased as the height from the optical axis of the incident ray of light on the optical element is increased.

An optical information recording reproducing apparatus described in Item 87 is characterized in that: in the case where the infinite objective distance ray of light whose height from the optical axis is h, is out-gone from the objective optical element, when the angle formed between the ray of light after the outgoing and the optical axis is expressed by U, and the sine condition unsatisfied amount is defined as SC1(h)=h/sin U−f (f: the focal length of the objective optical element when respective optical information recording media are used), in the common region, a sign of the sine condition unsatisfied amount which is the minimum when the first optical information recording medium is used and a sign of the sine condition unsatisfied amount which is the minimum when the second optical information recording medium is used, are negative.

An optical information recording reproducing apparatus described in Item 88 is characterized in that: in the case where the infinite objective distance ray of light whose height from the optical axis is h, is out-gone from the objective optical element, when the angle formed between the ray of light after the outgoing and the optical axis is expressed by U, and the sine condition unsatisfied amount is defined as SC1(h)=h/sin U−f (f: the focal length of the objective optical element when respective optical information recording media are used), when the maximum value of the sine condition unsatisfied amount absolute value in the common region when the first optical information recording medium is used, is $SC1_{max}$ and the maximum value of the sine condition unsatisfied amount absolute value in the common region when the second optical information recording medium is used, is $SC2_{max}$, it satisfies $$0.003 \text{ mm} \leq SC1_{max} \leq 0.020 \text{ mm} \tag{9}$$

$$0.010 \text{ mm} \leq SC2_{max} \leq 0.040 \text{ mm}. \tag{10}$$

An optical information recording reproducing apparatus described in Item 89 is characterized in that: in the case where the first optical information recording medium is used, when the height from the optical axis of the ray of light passing the outmost peripheral portion of the effective diameter of the objective optical element is hmax, the sine condition unsatisfied amount SC1 of the outmost peripheral ray of light satisfies $$|SC1(h\text{max})| \leq 0.010 \text{ mm}. \tag{11}$$

An optical information recording reproducing apparatus described in Item 90 is an optical information recording reproducing apparatus having: the first light source of the wavelength λ1 by which the recording or reproducing of the information is conducted by irradiating the light flux onto the first optical information recording medium whose transparent substrate thickness is t1; the second light source of the wavelength λ2 (λ1<λ2) by which the recording or reproducing of the information is conducted by irradiating the light flux onto the second optical information recording medium whose transparent substrate thickness is t2 (t1<t2); and the light converging optical system including the objective optical element by which the light fluxes out-gone from the first and the second light sources are converged onto the information recording surface through the transparent substrates of the first and the second optical information recording media; and the objective optical element has: an objective lens by which the light flux from the first or second light source is converged; and the optical function surface to give the optical action to the light flux; and the optical function surface of the objective optical element has the common region which includes the optical axis and is used for the recording and/or reproducing of the information for both of the first optical information recording medium and the second optical information recording medium, and the exclusive region which is provided outside of the common region, and is used for the recording and/or reproducing of the information for mainly onto the first optical information recording medium; and the objective optical element forms the spot diameter on the first optical information recording medium determined from the effective diameter and the focal length of the objective optical element, in the first optical information recording medium; and when the first optical information recording medium is used, when the infinite objective distance ray of light whose height form the optical axis is h, is out-gone from the objective optical element, the angle formed between the ray of light after the outgoing and the optical axis is expressed by U, and the sine condition unsatisfied amount is defined as SC1(h)=h/sin U−f (f: the focal length of the objective optical element when the first optical information recording medium is used), when the height from the optical axis of the ray of light passing the innermost peripheral portion of the exclusive region is $h_O$, the sine condition unsatisfied amount is $SC_1(h_O)$, and the height from the optical axis of the ray of light passing the outmost peripheral portion of the effective diameter of the objective optical element is $h_{max}$, because it satisfies $$SC1(h_O/2) \leq SC1_{out}(h_O) \tag{12}$$

$$SC1(h_O/2) \leq 0 \tag{13}$$

$$SC1(h_{max}) \geq 0 \tag{14},$$

the same effect as the invention described in Item 18 can be attained.

An optical information recording reproducing apparatus described in Item 91 is characterized in that: in the case where the first optical information recording medium is used, when the infinite objective distance ray of light whose height form the optical axis is h, is out-gone from the objective optical element, the angle formed between the ray of light after the outgoing and the optical axis is expressed by U, and the sine condition unsatisfied amount is defined as SC1(h)=h/sin U−f (f: the focal length of the objective optical element when the first optical information recording medium is used), a sign of the sine condition unsatisfied amount of the ray of light passing the outmost peripheral portion of the common region is positive.

An optical information recording reproducing apparatus described in Item 92 is characterized in that: on the optical function surface of the objective optical element, it has the diffractive structure making the optical axis a center of rotation, and on the surface of the optical information recording medium side on the optical function surface, the common region used for the recording and/or reproducing of the information onto both of the first optical information recording medium and the second optical information recording medium including the optical axis, and the exclusive region which is provided outside the common region and is used for the recording and/or reproducing of the information mainly onto the first optical information recording medium, and a step difference portion which adjoins the common region and the exclusive region and which is almost parallel to the optical axis and facing outside to the optical axis, is provided.

An optical information recording reproducing apparatus described in Item 93 is characterized in that: a step difference amount d2 of the step difference portion is $$0.000 \text{ mm} < d2 \leq 0.004 \text{ mm}. \tag{15}$$

An optical information recording reproducing apparatus described in Item 94 is the optical information recording reproducing apparatus having: the first light source of the wavelength λ1 by which the recording or reproducing of the information is conducted by irradiating the light flux onto the first optical information recording medium whose transparent substrate thickness is t1; the second light source of the wavelength λ2 (λ1<λ2) by which the recording or reproducing of the information is conducted by irradiating the light flux onto the second optical information recording medium whose transparent substrate thickness is t2 (t1<t2); and the light converging optical system including the objective optical element by which the light fluxes out-gone from the first and the second light sources are converged onto the information recording surface through the transparent substrates of the first and the second optical information recording media; and the objective optical element has: an objective lens to converge the light flux from the first light source or the second light source, and the optical function surface to give the optical action to the light flux; on the optical function surface of the light source side of the objective optical element, the diffractive structure making the optical axis a center of rotation is provided; on the optical function surface of the optical information recording medium side of the objective optical element, a common region which includes the optical axis, and is used for the recording and/or reproducing of the information onto both of the first optical information recording medium and the second optical information recording medium, and the exclusive region which is provided outside the common region and is used for the recording and/or reproducing of the information mainly onto the first optical information recording medium, and a step difference portion which adjoins the common region and the exclusive region, and which is almost parallel to the optical axis and faces outside to the optical axis, are provided; and because the objective optical element forms the spot diameter on the first optical information recording medium determined from the effective diameter and the focal length of the objective optical element, in the first optical information recording medium, the same effect as the invention described in Item 22 can be attained.

An optical information recording reproducing apparatus described in Item 95 is characterized in that: at the adjoining portion to the step difference portion in the common region of the objective optical element and at the adjoining portion to the step difference portion in the exclusive region, a sign of the local curvature R(h) is different.

An optical information recording reproducing apparatus described in Item 96 is characterized in that: at the adjoining portion to the step difference portion in the common region of the objective optical element and at the adjoining portion to the step difference portion in the exclusive region, a sign of the local curvature R(h) is reversed from the positive to the negative.

An optical information recording reproducing apparatus described in Item 97 is characterized in that: on the optical function surface of the light source side of the objective optical element, a common region which includes the optical axis, and is used for the recording and/or reproducing of the information onto both of the first optical information recording medium and the second optical information recording medium; the exclusive region which is provided outside the common region and is used for the recording and/or reproducing of the information mainly onto the first optical information recording medium; and a step difference portion which adjoins the common region and the exclusive region, and which is almost parallel to the optical axis and faces inside to the optical axis, are provided.

An optical information recording reproducing apparatus described in Item 98 is characterized in that: a step difference amount d2 of the step difference portion on the optical function surface of the optical information recording medium side is $$0.000 \text{ mm} < d2 < 0.004 \text{ mm}. \tag{16}$$

An optical information recording reproducing apparatus described in Item 99 is characterized in that: a step difference amount d1 of the step difference portion on the optical function surface of the light source side is $$0.000 \text{ mm} < d1 < 0.004 \text{ mm}. \tag{17}$$

An optical information recording reproducing apparatus described in Item 100 is characterized in that: in the common region of the light source side in the objective optical element, a diffractive structure in which the optical axis is made a center of rotation is formed.

An optical information recording reproducing apparatus described in Item 101 is characterized in that: when the first optical information recording medium and the second optical information recording medium are used, respectively, the image formation magnification by the objective optical element single body is almost infinite magnification.

An optical information recording reproducing apparatus described in Item 102 is characterized in that: the magnification m of the optical system from the light source to the optical information recording medium is, when the first optical information recording medium and the second optical information recording medium are used, respectively, $-\frac{1}{5} \leq m \leq -\frac{1}{10}$.

An optical information recording reproducing apparatus described in Item 103 is characterized in that: the image formation magnification by the objective optical element single body when the first optical information recording medium is used, is different from the image formation magnification by the objective optical element single body when the second optical information recording medium is used.

An optical information recording reproducing apparatus described in Item 104 is characterized in that: the light flux out-gone from the first light source is incident on the objective optical element as the infinite light flux, and the light flux out-gone from the second light source is incident on the objective optical element as the finite light flux.

An optical information recording reproducing apparatus described in Item 105 is characterized in that: the focal length f of the objective optical element is:

$$1.0 \text{ mm} \leq f \leq 4.0 \text{ mm}.$$

An optical information recording reproducing apparatus described in Item 106 is characterized in that: when the focal length f of the objective optical element is:

$$1.5 \text{ mm} \leq f \leq 3.5 \text{ mm},$$

the transparent substrate thickness t1 of the first optical information recording medium is a half of the transparent substrate thickness t2 of the second optical information recording medium (2×t1 ≈t2), the required numerical aperture when the first optical information recording medium is used, is NA1, and the required numerical aperture when the second optical information recording medium is used, is NA2, it satisfies:

$$0.59 \leq NA1 \leq 0.68 \text{ and } 0.43 \leq NA2 \leq 0.58 \tag{18}.$$

An optical information recording reproducing apparatus described in Item 107 is characterized in that: the respective comas at the angle of view 1° are, respectively, suppressed not larger than 0.05 λ rms.

An optical information recording reproducing apparatus described in Item 108 is characterized in that: it has the light source in which the light source for the first optical information recording medium and the light source for the second optical information recording medium are unitized.

A "diffractive structure" used in the present specification means a portion to which a relief is provided, and an action to converge or diverge the light flux by the diffraction is provided. As the shape of the relief, for example, on the surface of the objective lens, it is formed as a concentric circular ring-shaped zone around the optical axis, and when its cross section is viewed in the plane including the optical axis, it is well known that each ring-shaped zone has the saw-toothed shape, and it includes such a shape, and such a shape is specifically called the "diffraction ring-shaped zone".

In the present specification, the objective lens means a lens having, in the narrow meaning, in the status that the optical information recording medium is loaded in the optical pick-up apparatus, at the position of the most optical information recording medium side, the light converging action which is positioned to oppose to it, and in the wide meaning, together with the lens, it means a lens group which can be moved at least in the optical axis direction by the actuator. Herein, such a lens group means lenses at least more than one (for example, 2 lenses). Accordingly, in the present specification, the numerical aperture NA on the optical information recording medium side (image side) of the objective lens indicates the numerical aperture NA of the lens surface positioned on the most optical information recording medium side of the objective lens. Further, in the present specification, the necessary numerical aperture NA means a numerical aperture regulated by standards of the respective optical information recording media, or it means, to respective optical information recording media, corresponding to the wavelength of the using light source, the numerical aperture of the objective lens of the diffraction limit performance by which a necessary spot diameter to record or reproduce the information can be obtained.

In the present specification, the second optical information recording medium means an optical disk of each kind of CD-series, for example, CD-R, CD-RW, CD-Video, or CD-ROM, and the first optical information recording medium means an optical disk of each kind of DVD series such as DVD-POM, DVD-RAM, DVD-R, DVD-RW, or DVD-Video. Furthermore, in the present specification, the "transparent substrate thickness t" includes t=0.

DETAILED DESCRIPTION OF THE PREFERRED EMBODIMENT

Figure 1:
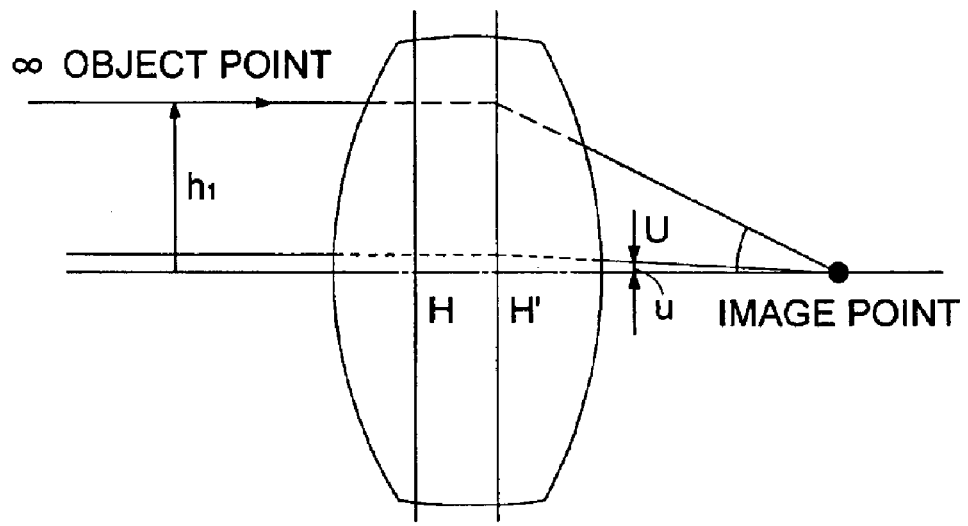
FIG. 1 is a view for explaining the sine condition.
Figure 2:
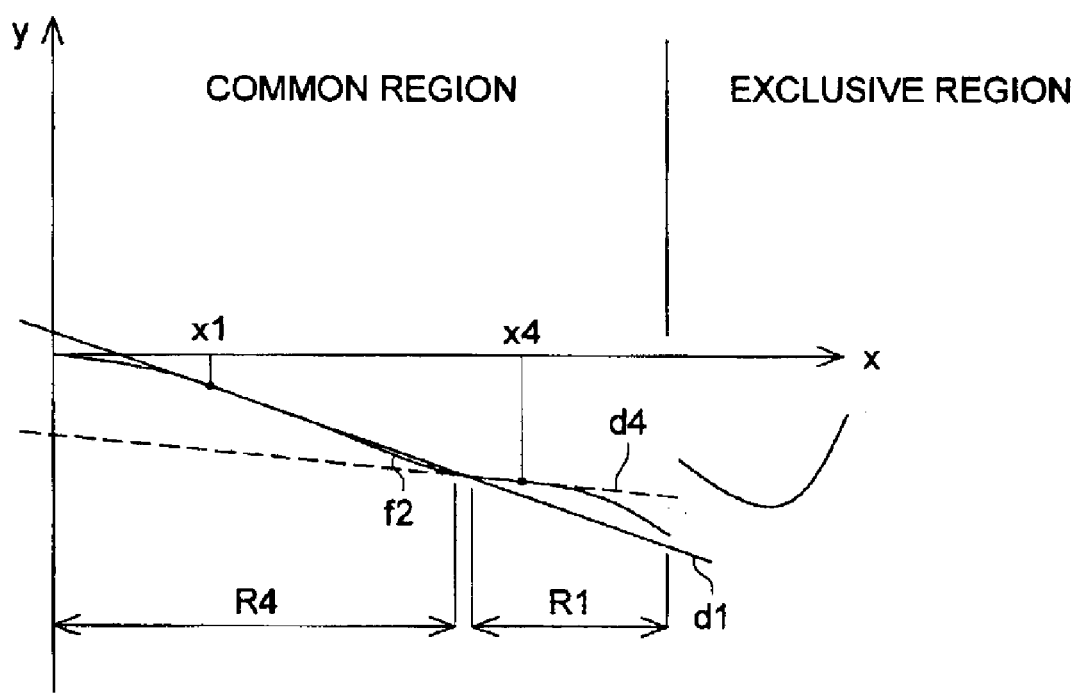
FIG. 2 is a view for explaining the sine condition unsatisfied amount when the second optical information recording medium is used.
Figure 3:
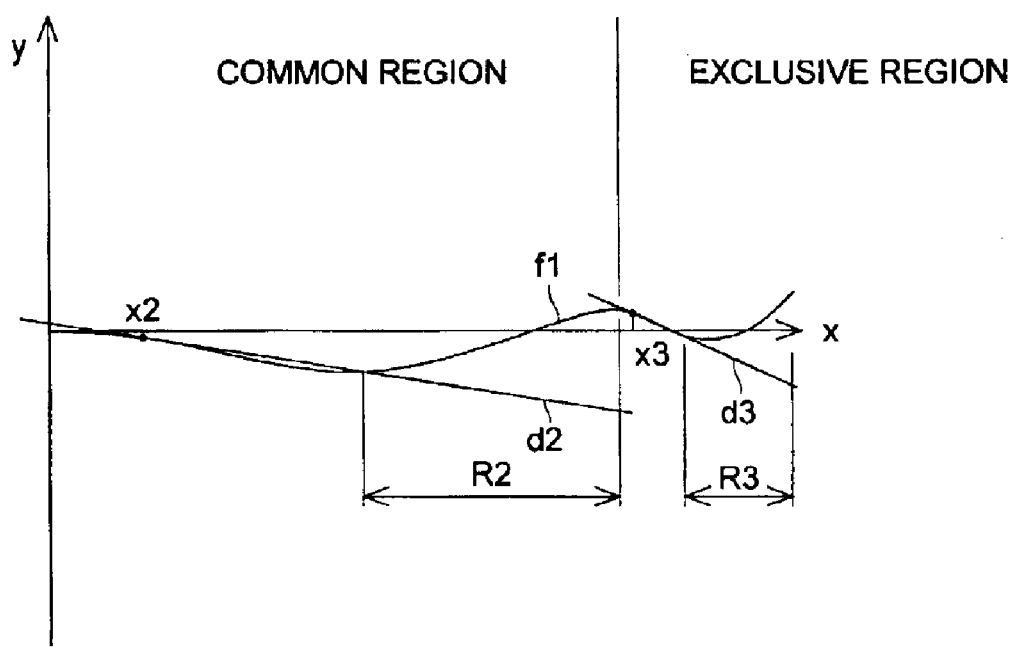
FIG. 3 is a view for explaining the sine condition unsatisfied amount when the first optical information recording medium is used.
Figure 4:
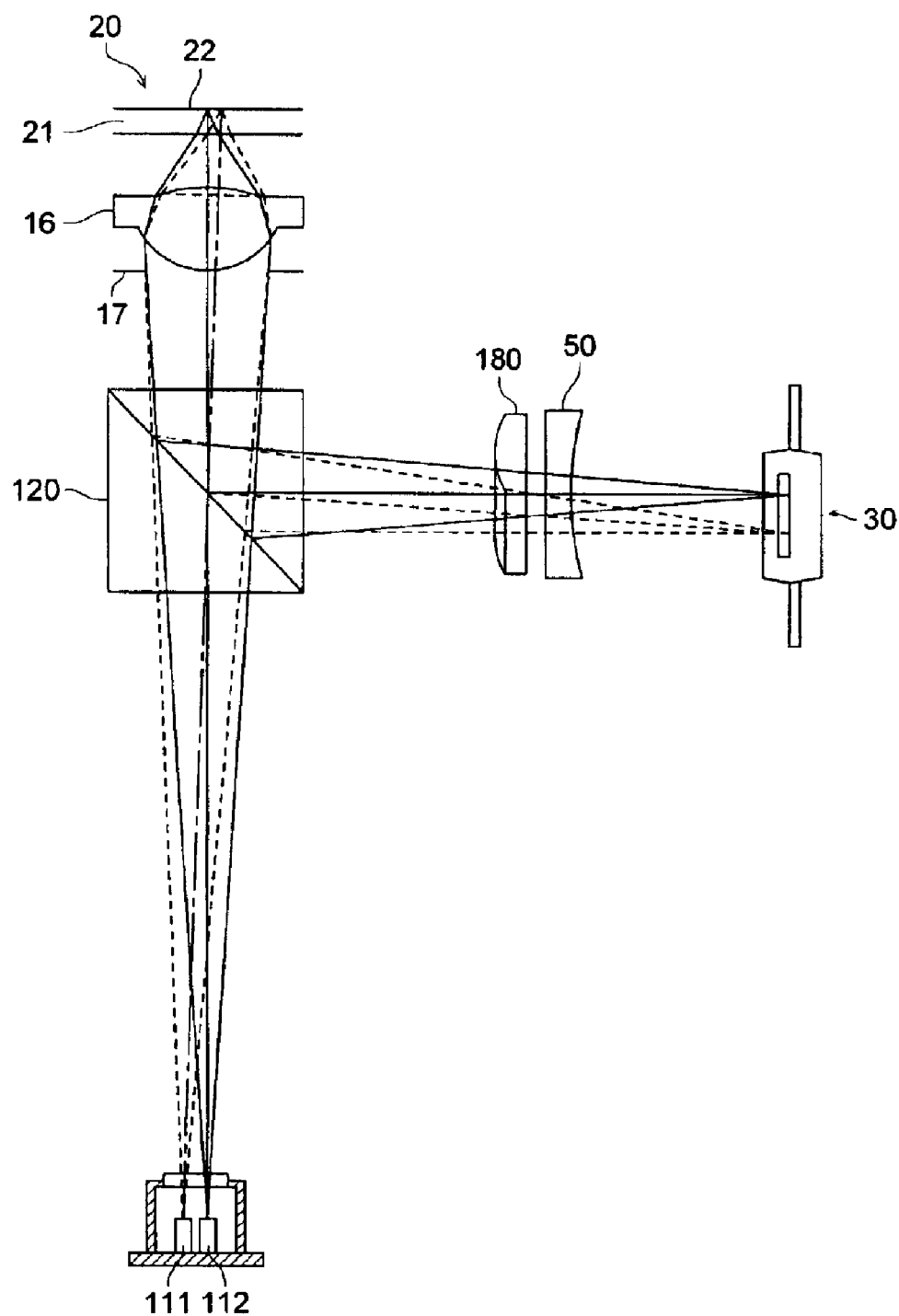
FIG. 4 is a outline structural view of an optical information recording reproducing apparatus or an optical pick-up apparatus (including 2-laser 1 package module type light source) according to the present embodiment.
Figure 5A:
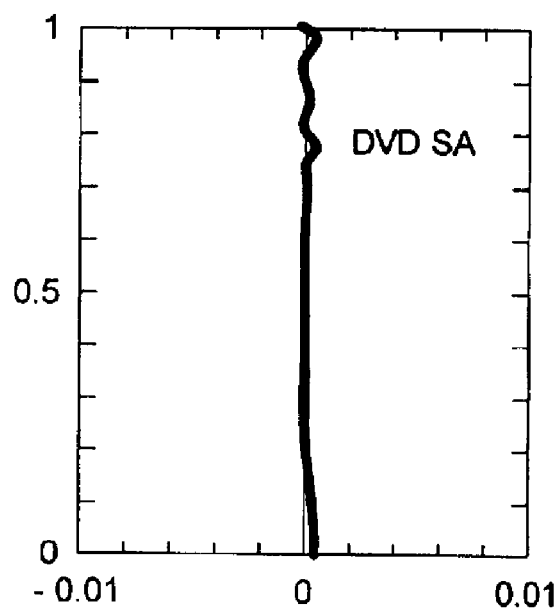
FIGS. 5(a) and 5(b) each is a view in which the spherical aberration view (shown by the longitudinal spherical aberration amount) according to an objective lens of the example 1 is respectively shown for the DVD (a) and CD (b).
Figure 5B:
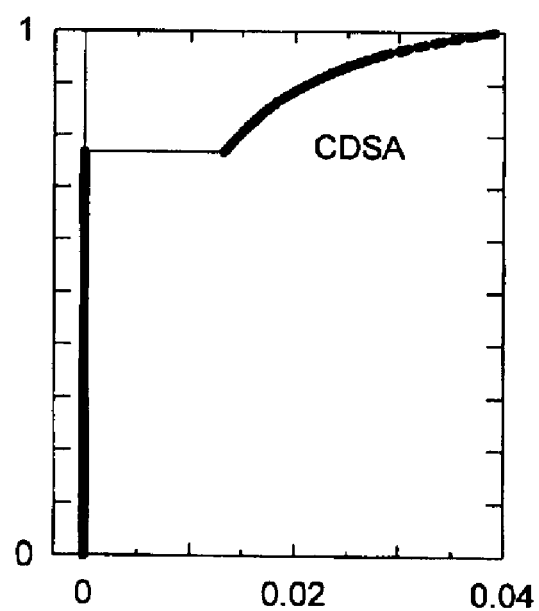

Referring to the drawings, the present invention will be more detailed below. FIG. 4, is an outline structural view of an optical information recording reproducing apparatus or optical pick-up apparatus (including the light source of the 2-laser 1 package module type) according to the present embodiment. In FIG. 4, the first semiconductor laser 111 as the first light source and the second semiconductor laser 112 as the second light source are attached onto the same substrate surface which is perpendicular to the optical axis, and structured as one unit. The beam out-gone from the first semiconductor laser 111 (the wavelength $\lambda 1$=610 nm–670 nm) transmits the beam splitter 120 and stopped by the stop 17, and converged onto the information recording surface 22 through the transparent substrate 21 of the first optical disk 20 by the objective lens 16.

The light flux modulated and reflected by the information bit on the information recording surface 22 passes again the objective lens 16 and the stop 17, and incident on the beam splitter 120, and reflected here, and the astigmatism is given by the cylindrical lens 180, and incident on the photo detector 30 through the concave lens 50, and its output signal is used, and the reading-out signal of the information which is information-recorded onto the first optical disk 20 is obtained.

Further, the light amount change due to the shape change and position change of the spot on the photo detector 30 is detected, and the focusing detection or track detection is conducted. According to this detection, the second dimensional actuator (not shown) moves the objective lens 16 so that the light flux from the first semiconductor laser 111 is image formed onto the recording surface 22 of the of the first optical disk 20, and moves the objective lens 16 so that the light flux from the semiconductor laser 111 is image formed on the predetermined track.

The beam out-gone from the second semiconductor laser 112 (there wavelength λ1=740 nm–870 nm) transmits the beam splitter 120 which is a light wave compound means, and further, through the stop 17 and the objective lens 16, is converged onto the information recording surface 22 through the transparent substrate 21 of the second optical disk 20.

Then, the light flux modulated and reflected on the information recording surface 22 by the information pit, is reflected again by the objective lens 16, stop 17, and beam splitter 120, and the astigmatism is given by the cylindrical lens 180, and incident on the photo detector 30 through the concave lens 50, and using its output signal, the reading-out signal of the information recorded in the second optical disk 20 is obtained.

Further, the light amount change due to the shape change and the position change of the spot on the photo detector 30 is detected, and the focusing detection or track detection is conducted, and the objective lens 16 is moved by the second dimensional actuator (not shown) for the focusing and tracking.

In this connection, in FIG. 4, an optical pick-up apparatus in which the diverging light flux is incident on the objective lens is shown, but in the following examples, a parallel light flux is incident on the objective lens when the DVD or CD is used. Accordingly, the surface interval between the 0-th surface abd the first surface is ∞. A case where a collimator lens exists between each of semiconductor lasers 111, 112, and the beam splitter 120, is presumed.

A preferred example of the above-described embodiment will be described below. Both surfaces of the objective lens are aspheric surfaces shown by [Expression 1]. Where, Z is the axis in the optical axis direction, h is the height from the optical axis, r is the paraxial radius of curvature, κ is the conical coefficient, and $A_{2i}$ is the aspheric surface coefficient.

$$Z = \frac{(h^2/r)}{1 + \sqrt{1 - (1+\kappa)(h/r)^2}} + \sum_{i=1}^{9} A_{2i} h^{2i} \quad \text{[Expression 1]}$$

Further, the local curvature R(h) used in the present specification is defined by [Expression 2].

$$R(h) = \frac{\left(1 + \left(\frac{dz}{dh}\right)^2\right)^{3/2}}{\left(\frac{d z^2}{d^2 h}\right)} \quad \text{[Expression 2]}$$

Further, the diffractive structure is integrally formed on the surface of the light source side aspheric surface of the objective lens. This diffractive structure is expressed by [Expression 3] as the unit is made mm by the optical path difference function Φ to the blazed wavelength λ.B. The paraxial power of the diffractive portion is expressed by this secondary coefficient. Further, by the coefficient other than secondary one, for example, 4-th, 6-th order coefficient, the spherical aberration can be controlled. Herein, "can be controlled" means that the spherical aberration is corrected as the total by providing the spherical aberration of the reversal characteristic at the diffraction portion, on the spherical aberration which the refractive portion has, or that, by operating the spherical aberration of the diffraction portion, the total spherical aberration is made to a desired flare amount. In this case, the spherical aberration at the time of temperature change can also be considered as the total of the temperature change of the spherical aberration of the refraction portion and the spherical aberration change of the diffraction portion.

$$\Phi = \sum_{i=1}^{\infty} c_i h^{2i} \text{ (mm)} \quad \text{[Expression 3]}$$

EXAMPLE 1

In the present example, 2 optical function surfaces are formed on the surface of the light source side of the objective lens as the objective optical element. On the optical function surface including the optical axis, the inside optical function surface (common region) in which the spherical aberration when the DVD, and CD are respectively used, is corrected, is formed, and on the optical function surface outside that, an exclusive region in which the light flux passing such a optical function surface when the spherical aberration is corrected when the DVD is used, and when the CD is used in the situation of a best focus, is the flare light on the optical information recording medium surface, is formed. In Table 2, the lens data of the objective lens according to the present example is shown.

TABLE 2

$f_1$ = 3.05 mm $f_2$ = 3.07 mm NA1: 0.60 NA2: 0.47

| The i-th surface | ri | di (655 nm) | ni (655 nm) | di (785 nm) | ni (785 nm) | |
|---|---|---|---|---|---|---|
| 0 | | ∞ | | ∞ | | |
| 1 | ∞ | 0.0 | 1.0 | 0.0 | 1.0 | Stop diameter Φ3.660 mm |
| 2 | 1.87178 | 1.72000 | 1.52915 | 1.72000 | 1.52541 | |
| 2' | 1.92357 | 1.72000 | 1.52915 | 1.72000 | 1.52541 | |
| 3 | −7.98941 | 1.69938 | 1.0 | 1.33477 | 1.0 | |
| 4 | ∞ | 0.6 | 1.57752 | 1.2 | 1.57063 | |
| 5 | ∞ | | | | | |

Aspheric Surface Data
The second surface (0<h<1.419 mm: DVD/CD common region)
 Aspheric Surface Coefficient
  κ −1.0230×E−0

| | | | |
|---|---|---|---|
| A1 | +5.7970 × E−3 | P1 | 4.0 |
| A2 | −4.8819 × E−4 | P2 | 6.0 |
| A3 | +1.1480 × E−3 | P3 | 8.0 |
| A4 | −4.3700 × E−4 | P4 | 10.0 |
| A5 | +7.8504 × E−5 | P5 | 12.0 |
| A8 | −1.4534 × E−5 | P6 | 14.0 |

Optical path difference function (coefficient of optical path difference function: reference wavelength 720 nm)
 C4 −2.0201×E−0
 C6 −8.9539×E−1
 C8 +3.8143×E−1
 C10 −8.1400×E−2
The 2'-th surface (1.419 mm<h: DVD exclusive region)
 Aspheric Surface Coefficient
  κ −3.2868×E−1

| | | | |
|---|---|---|---|
| A1 | −3.7854 × E−3 | P1 | 4.0 |
| A2 | +1.1888 × E−4 | P2 | 6.0 |
| A3 | +2.2964 × E−4 | P3 | 8.0 |
| A4 | −1.3557 × E−4 | P4 | 10.0 |
| A5 | −8.0336 × E−5 | P5 | 12.0 |
| A6 | +1.8473 × E−5 | P6 | 14.0 |

Optical path difference function (coefficient of optical path difference function: reference wavelength 655 nm)
 C2 −1.0061×E+1
 C4 +6.3493×E−0
 C6 −2.1340×E−0
 C8 −8.3911×E−2
 C10 +7.1252×E−2
The third surface aspheric surface coefficient
 κ +8.4421×E+0

| | | | |
|---|---|---|---|
| A1 | +1.0492 × E−2 | P1 | 4.0 |
| A2 | +7.9177 × E−3 | P2 | 6.0 |
| A3 | −4.8995 × E−3 | P3 | 8.0 |
| A4 | +2.2015 × E−4 | P4 | 10.0 |
| A5 | +3.4801 × E−4 | P5 | 12.0 |
| A6 | −5.6907 × E−5 | P6 | 14.0 |

In this connection, in the objective lens in the present example, because the above-described design is conducted, even when the stop diameters are same in the DVD and CD, the required main spot diameter is obtained on the optical information recording medium surface. Relating to the coma value outside the CD axis, because the order of the distance of the main spot light and the flare light formed in the exclusive region is about 10 times of the spot diameter, the estimation is conducted on the light flux of only the common region.

Figure 6:
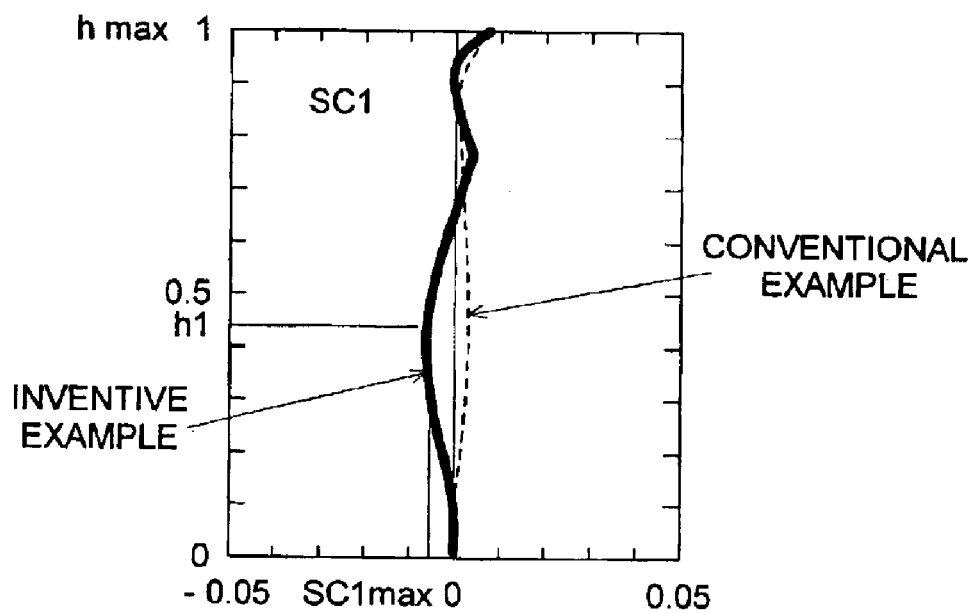
FIGS. 6(a) and 6(b) each is a view in which the sine condition unsatisfied amount according to an objective lens of the example 1 is respectively shown for the DVD (a) and CD (b).
Figure 6:
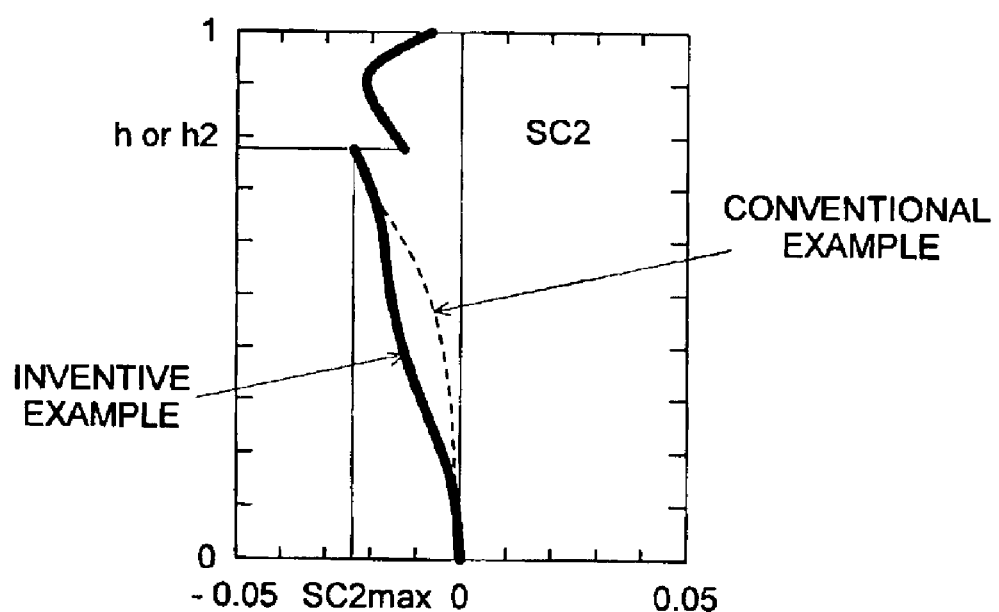

In this manner, in the situation that both of the sine condition unsatisfied amount at the time of the transparent substrate thickness can not be made zero in principle, the design in which the respective comas outside axis of DVD/CD are balanced, can be attained. As in FIG. 6, when the eye is put on the CD sine condition unsatisfied amount design, although in the common region, the sine condition unsatisfied amount of the present example is generally larger than the conventional example, its curve design itself is controlled, the outside-axis coma can be more reduced than the conventional example as a result. In the present example, although it is not the purpose that the sine condition unsatisfied amount in the DVD is made zero perfectly, the DVD outside-axis coma as a result can also be suppressed in the level of no problem practically. In this connection, in FIG. 6, h, h1, h2, and hmax correspond to the signs used in claims. Further, values defined in Items are as follows in Examples.

| | |
|---|---|
| SC1max | 0.006 mm |
| SC2max | 0.024 mm |
| SC1 (hmax) | 0.007 mm |
| SC1 ($h_0$) | 0.004 mm |
| SC1 ($h_0/2$) | −0.006 mm |
| SC2 ($h_0$) | −0.024 mm |
| SC2 ($h_0/2$) | −0.012 mm |

EXAMPLE 2

Figure 9:
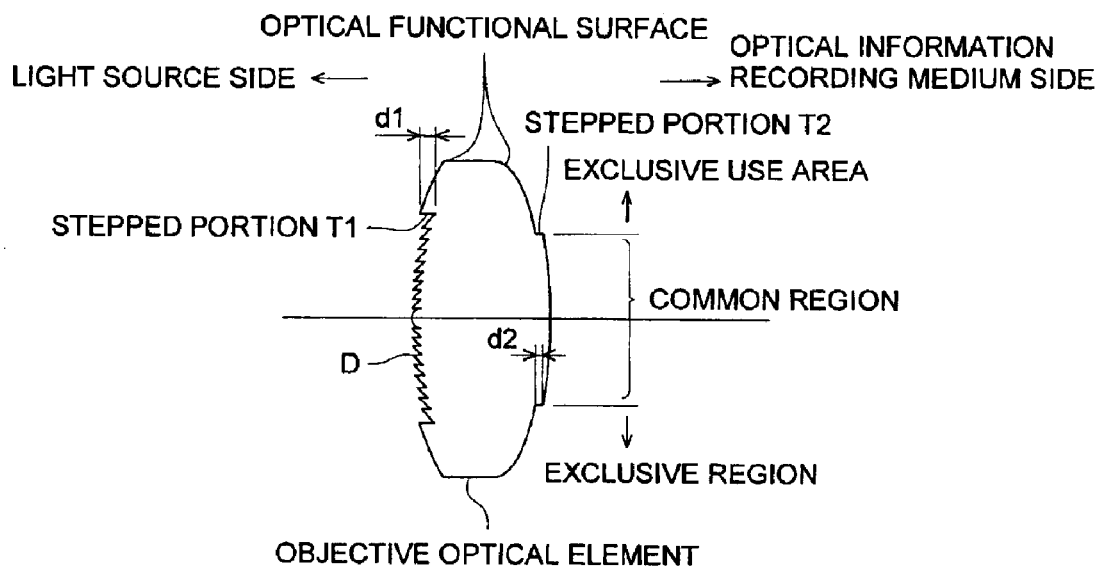
FIG. 9 is a sectional view of the objective lens in which a step difference and a diffraction ring-shaped zone formed on an optical function surface of the optical information recording medium side are exaggeratedly shown.
Figure 10:
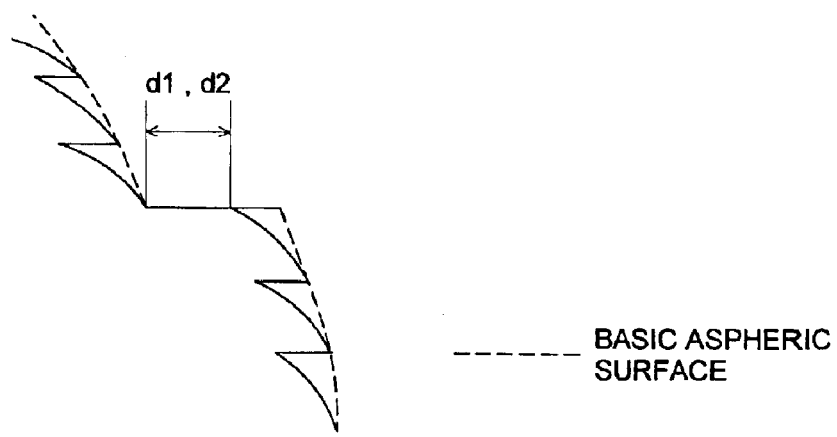
FIG. 10 is a view showing an example of a step difference amount (d1, d2) of the step difference portion T1, T2) on the optical function surface.

In the present example, 2 optical function surfaces are formed on the surfaces of both of the light source side and the optical information recording medium side of the objective lens as the objective optical element. On the optical function surface including the optical axis, the inside optical function surface (common region) in which the spherical aberration when the DVD and CD are respectively used, is corrected, is formed, and on the optical function surface outside that, the exclusive region in which the spherical aberration is corrected when the DVD is used, and when the CD is used in the best focus condition, the light flux passing such a optical function surface is the flare light on the optical information recording medium surface, is formed. Further, between the common region and the exclusive region, a step difference portion as shown in FIG. 9, is provided. In Table 3, the lens data of the objective lens according to the present example is shown.

TABLE 3

$f_1$ = 3.36 mm $f_2$ = 3.38 mm NA1: 0.60 NA2: 0.47

| The i-th surface | ri | di (655 nm) | ni (655 nm) | di (788 nm) | ni (788 nm) | |
|---|---|---|---|---|---|---|
| 0 | | ∞ | | ∞ | | |
| 1 | ∞ | 0.0 | 1.0 | 0.0 | 1.0 | Stop diameter Φ4.032 mm |
| 2 | 2.08078 | 2.20000 | 1.52915 | 2.20000 | 1.52534 | |

TABLE 3-continued $f_1 = 3.36$ mm $f_2 = 3.38$ mm NA1: 0.60 NA2: 0.47

| The i-th surface | ri | di (655 nm) | ni (655 nm) | di (788 nm) | ni (788 nm) |
|---|---|---|---|---|---|
| 2' | 2.00570 | 0.00091 | 1.52915 | 0.00091 | 1.52534 |
| 3 | −7.74668 | 1.75045 | 1.0 | 1.33797 | 1.0 |
| 3' | −7.75528 | 0.00156 | 1.0 | 0.00156 | 1.0 |
| 4 | ∞ | 0.6 | 1.57752 | 1.2 | 1.57051 |
| 5 | ∞ | | | | |

*di shows the displacement from the i-th surface to the (i + 1)-th surface.
*d2', d3' respectively show the displacement from the 2nd surface, 3rd surface to the 2'nd surface, and the 3'rd surface.

Aspheric Surface Data
The 2nd surface (0<h<1.589 mm: DVD/CD common region)
Aspheric Surface Coefficient
$\kappa$ −2.3679×E−0

| A1 | +2.4225 × E−2 | P1 | 4.0 |
|---|---|---|---|
| A2 | −3.2907 × E−3 | P2 | 6.0 |
| A3 | +5.8739 × E−4 | P3 | 8.0 |
| A4 | −3.2231 × E−5 | P4 | 10.0 |

Optical path difference function (coefficient of the optical path difference function: reference wavelength 720 nm)
C4 −2.0201×E−0
C6 −8.9539×E−1
C8 +3.8143×E−1
C10 −8.1400×E−2

The 2'nd surface (1.589 mm<h: DVD exclusive region)
Apheric Surface Coefficient
$\kappa$ −8.5949×E−1

| A1 | −5.4305 × E−3 | P1 | 4.0 |
|---|---|---|---|
| A2 | +4.4524 × E−4 | P2 | 6.0 |
| A3 | +1.1271 × E−3 | P3 | 8.0 |
| A4 | −2.4275 × E−4 | P4 | 10.0 |
| A5 | −4.0506 × E−6 | P5 | 12.0 |
| A6 | +3.2614 × E−6 | P6 | 14.0 |

Optical path difference function (coefficient of the optical path difference function: reference wavelength 655 nm)
C2 −1.0061×E+1
C4 +6.3493×E−0
C6 −2.1340×E−0
C8 −8.3911×E−2
C10 +7.1252×E−2

The 3rd surface (0<h<1.163 mm: DVD/CD common region)
Aspheric Surface
$\kappa$ +1.5681×E+1

| A1 | +2.0648 × E−2 | P1 | 4.0 |
|---|---|---|---|
| A2 | −9.4490 × E−3 | P2 | 6.0 |
| A3 | +9.7699 × E−3 | P3 | 8.0 |
| A4 | −3.6532 × E−3 | P4 | 10.0 |

-continued

| A5 | −2.8584 × E−4 | P5 | 12.0 |
|---|---|---|---|
| A6 | +3.6042 × E−4 | P6 | 14.0 |

The 3'rd surface (1.163 mm<h: DVD exclusive region)
Aspheric Surface
$\kappa$ +9.7980×E+0

| A1 | +1.4045 × E−2 | P1 | 4.0 |
|---|---|---|---|
| A2 | −2.0311 × E−3 | P2 | 6.0 |
| A3 | +2.0822 × E−3 | P3 | 8.0 |
| A4 | −1.3361 × E−3 | P4 | 10.0 |
| A5 | +3.6669 × E−4 | P5 | 12.0 |
| A6 | −3.6902 × E−5 | P6 | 14.0 |

Figure 7:
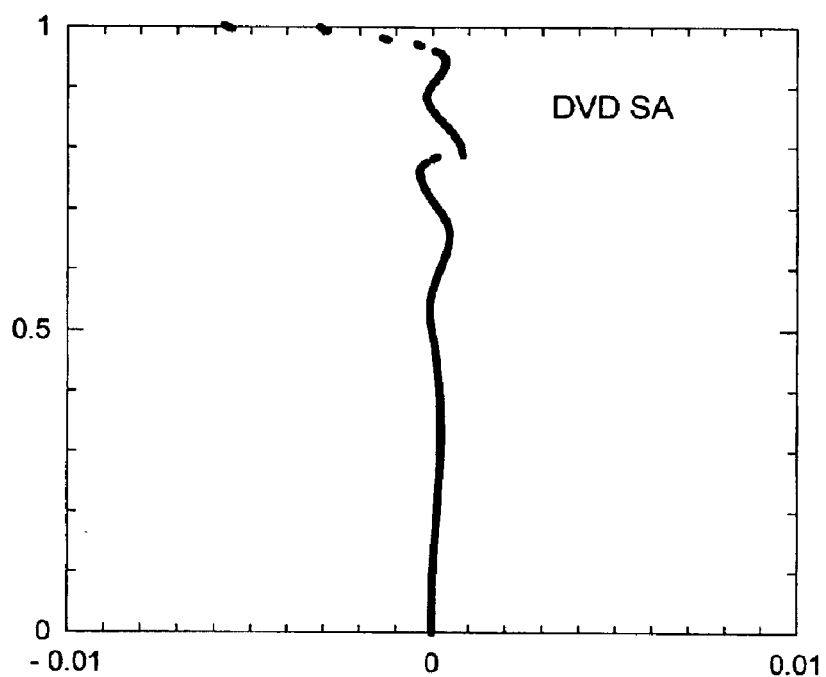
FIGS. 7(a) and 7(b) each is a view in which the spherical aberration view (shown by the longitudinal spherical aberration amount) according to the objective lens of the example 2 is respectively shown for the DVD (a) and CD (b).
Figure 7:
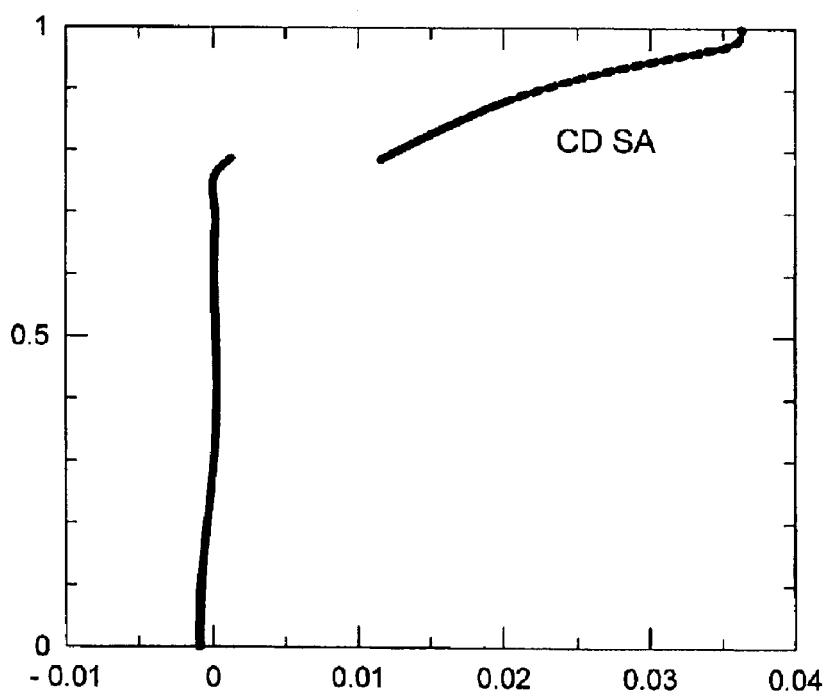
Figure 8:
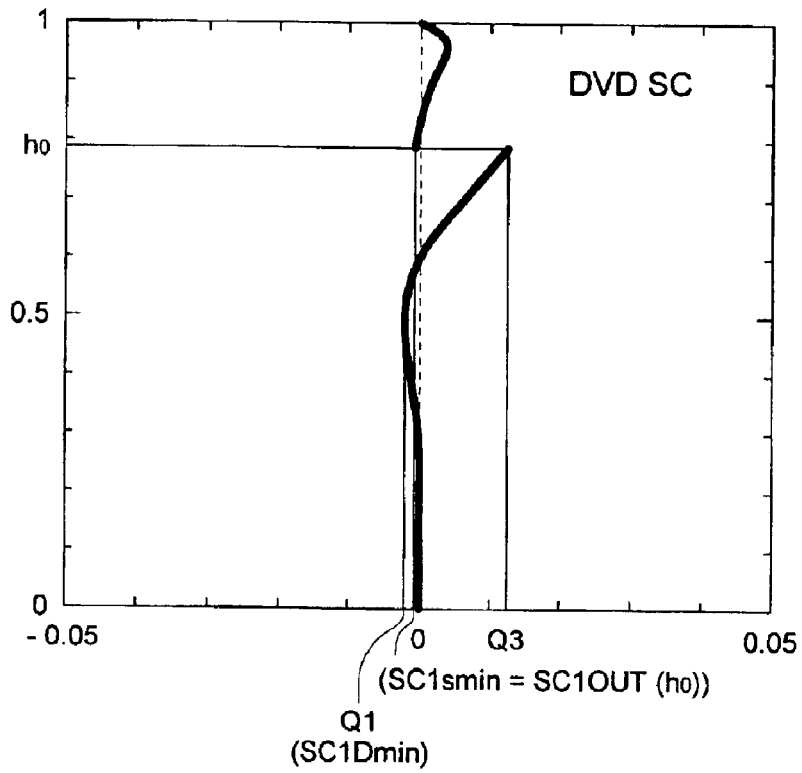
FIGS. 8(a) and 8(b) is a view in which the sine condition unsatisfied amount according to the objective lens of the example 2 is respectively shown for the DVD (a) and CD (b).
Figure 8:
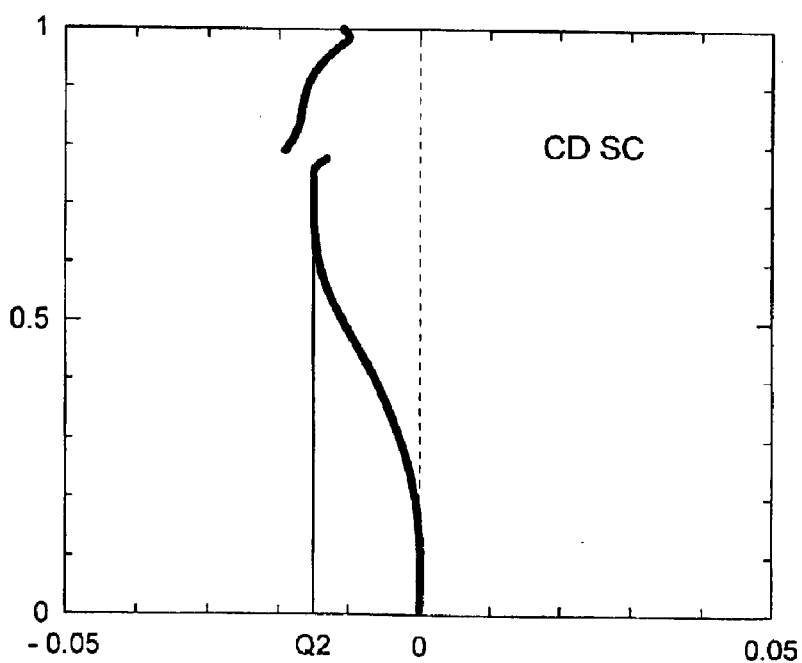

In FIG. 7 and FIG. 8, a spherical aberration view and a view of the sine condition unsatisfied amount are respectively shown for the example 2. Unit of the horizontal line is mm.

In the present example, the objective lens design in which, while the deterioration of the DVD outside-axis coma is being suppressed, the CD outside-axis coma is improved, is conducted. In the present example, the sine condition unsatisfied amount which satisfies this requirement and is shown in FIG. 8, is found. As the result, it can be performed that the coma (COMA1) when the parallel light flux is incident at the angle of view 1° when the DVD is used, is 0.006 λ1 rms, and the coma (COMA2) when the CD is used, is 0.08 λ2 rms. In this connection, the values defined in claims are as follows in the example.

| SC1max | 0.012 mm |
|---|---|
| SC2max | 0.015 mm |
| SC1 (hmax) | −0.001 mm |
| SC1 ($h_0$) | 0.012 mm |
| SC1 ($h_0/2$) | −0.001 mm |
| SC2 ($h_0$) | −0.014 mm |
| SC2 ($h_0/2$) | −0.006 mm |
| $SC1_{Dmin}$ | −0.002 mm |
| $SC1_{smin}$ | −0.001 mm |
| $SC1_{out}$ (h) | −0.001 mm |
| d1 | 0.001 mm |
| d2 | 0.002 mm |
| $h_{CDNA}$ | 1.589 mm |

EXAMPLE 3

In the present example, 2 optical function surfaces are formed on the both surfaces of the light source side and optical information recording medium side of the objective lens as the objective optical element. On the optical function surface including the optical axis, the inside optical function surface (common region) in which the spherical aberration when the DVD (light source wavelength 655 nm) and CD (light source wavelength 785 nm) are respectively used, is corrected, is formed, and on the optical function surface outside that, the exclusive region in which the light flux whose spherical aberration is corrected when the DVD is used, and which passes such a optical function surface when the CD is used at the best focus condition, is a flare light on the optical information recording medium surface, is formed. In Table 4, the lens data of the objective lens according to the present example is shown.

TABLE 4

Example 3 lens data
$f_1 = 1.80$ mm $f_2 = 1.81$ mm NA1: 0.60 NA2: 0.47

| The i-th surface | ri | di (655 nm) | ni (655 nm) | di (780 nm) | ni (780 nm) | |
|---|---|---|---|---|---|---|
| 0 |   | ∞ |   | 29.33910 |   |   |
| 1 | ∞ | 0.0 | 1.0 | 0.0 | 1.0 | stop diameter Φ2.160 mm |
| 2 | 1.12922 | 0.92000 | 1.54094 | 0.92000 | 1.53728 |   |
| 2' | 1.25557 | 0.00860 | 1.54094 | 0.00860 | 1.53728 |   |
| 3 | −5.04774 | 0.90505 | 1.0 | 0.65069 | 1.0 |   |
| 3' | −3.93413 | 0.00000 | 1.0 | 0.00000 | 1.0 |   |
| 4 | ∞ | 0.6 | 1.57752 | 1.2 | 1.57084 |   |
| 5 | ∞ |   |   |   |   |   |

*di shows the displacement from the i-th surface to the (i + 1)-th surface.
*d2', d3' respectively show the displacement from the 2nd surface, 3rd surface to the 2'nd surface, and the 3'rd surface.

Aspheric Surface Data
The 2nd surface ($0 \leq h \leq 0.900$ mm: DVD/CD common region)
Aspheric Surface Coefficient
κ −1.4625×E−0

| A1 | +7.6022 × E−2 | P1 | 4.0 |
| A2 | −2.1865 × E−2 | P2 | 6.0 |
| A3 | +6.0304 × E−2 | P3 | 8.0 |
| A4 | −9.9892 × E−2 | P4 | 10.0 |
| A5 | +1.1041 × E−1 | P5 | 12.0 |
| A6 | −4.7810 × E−2 | P6 | 14.0 |

Optical path difference function (coefficient of optical path difference function: reference wavelength 720 nm)
C4 −7.9189×E−1
C6 −1.4005×E+1
C8 +6.8812×E−0

The 2'nd surface (0.900 mm<h: DVD exclusive region)
Aspheric Surface Coefficient
κ −1.0150×E−0

| A1 | +1.0375 × E−1 | P1 | 4.0 |
| A2 | −1.7430 × E−2 | P2 | 6.0 |
| A3 | −1.2551 × E−2 | P3 | 8.0 |
| A4 | +1.4297 × E−3 | P4 | 10.0 |
| A5 | +9.8299 × E−3 | P5 | 12.0 |
| A6 | −8.3141 × E−3 | P6 | 14.0 |

Optical path difference function (coefficient of optical path difference function: reference wavelength 655 nm)
C2 +7.2457×E−1
C4 −2.6654×E−0
C6 −4.7087×E−0
C8 −1.0307×E−0
C10 −2.5585×E−0

The 3rd surface ($0 \leq h \leq 0.754$ mm: DVD/CD common region)
Aspheric Surface Coefficient
κ −2.9759×E+1

| A1 | +7.3798 × E−3 | P1 | 4.0 |
| A2 | +5.6739 × E−2 | P2 | 6.0 |
| A3 | −3.8042 × E−2 | P3 | 8.0 |
| A4 | −4.5903 × E−2 | P4 | 10.0 |
| A5 | +1.0494 × E−1 | P5 | 12.0 |
| A6 | −7.5467 × E−2 | P6 | 14.0 |

The 3'rd surface (0.754 mm<h: DVD exclusive region)
Aspheric Surface Coefficient
κ −9.6145×E+1

| A1 | +2.7265 × E−2 | P1 | 4.0 |
| A2 | −4.0614 × E−2 | P2 | 6.0 |
| A3 | +7.7366 × E−2 | P3 | 8.0 |
| A4 | −9.7942 × E−2 | P4 | 10.0 |
| A5 | +5.4540 × E−2 | P5 | 12.0 |
| A8 | −1.2174 × E−2 | P6 | 14.0 |

Figure 11:
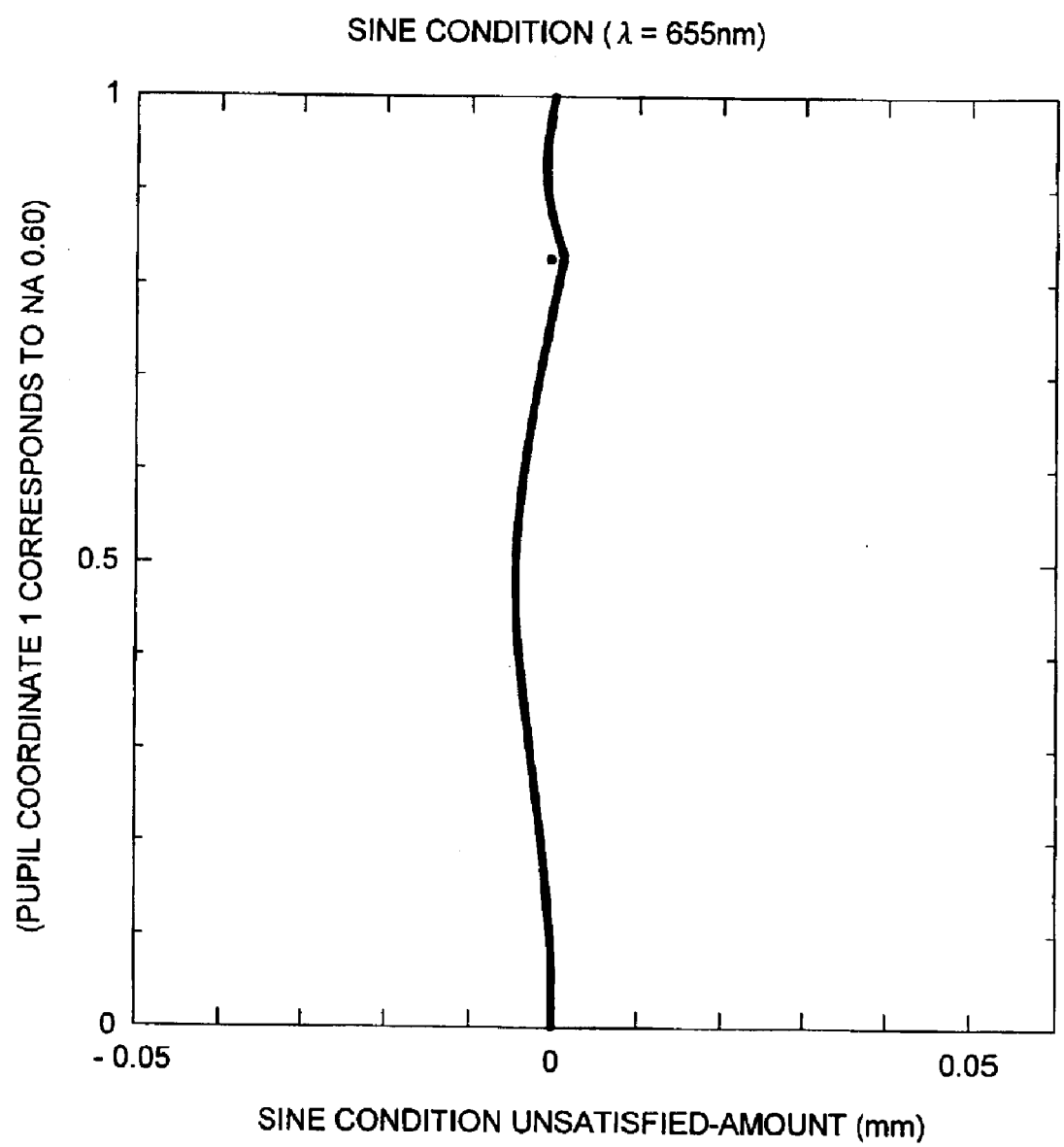
FIG. 11 is a view showing the sine condition unsatisfied amount according to the objective lens in Example 3 for the DVD.
Figure 12:
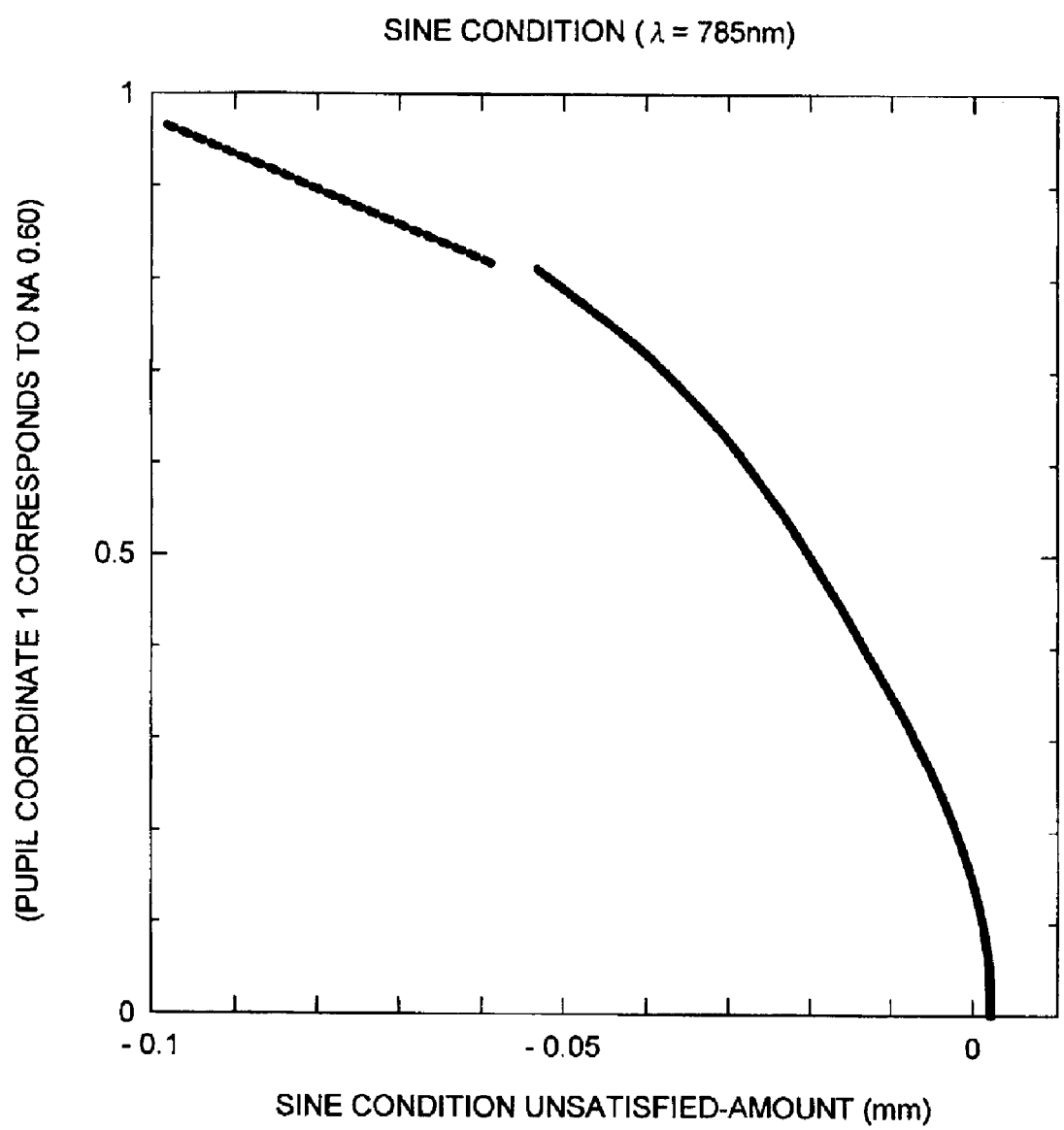
FIG. 12 is a view showing the sine condition satisfied amount according to the objective lens in Example 3 for the CD.
Figure 13:
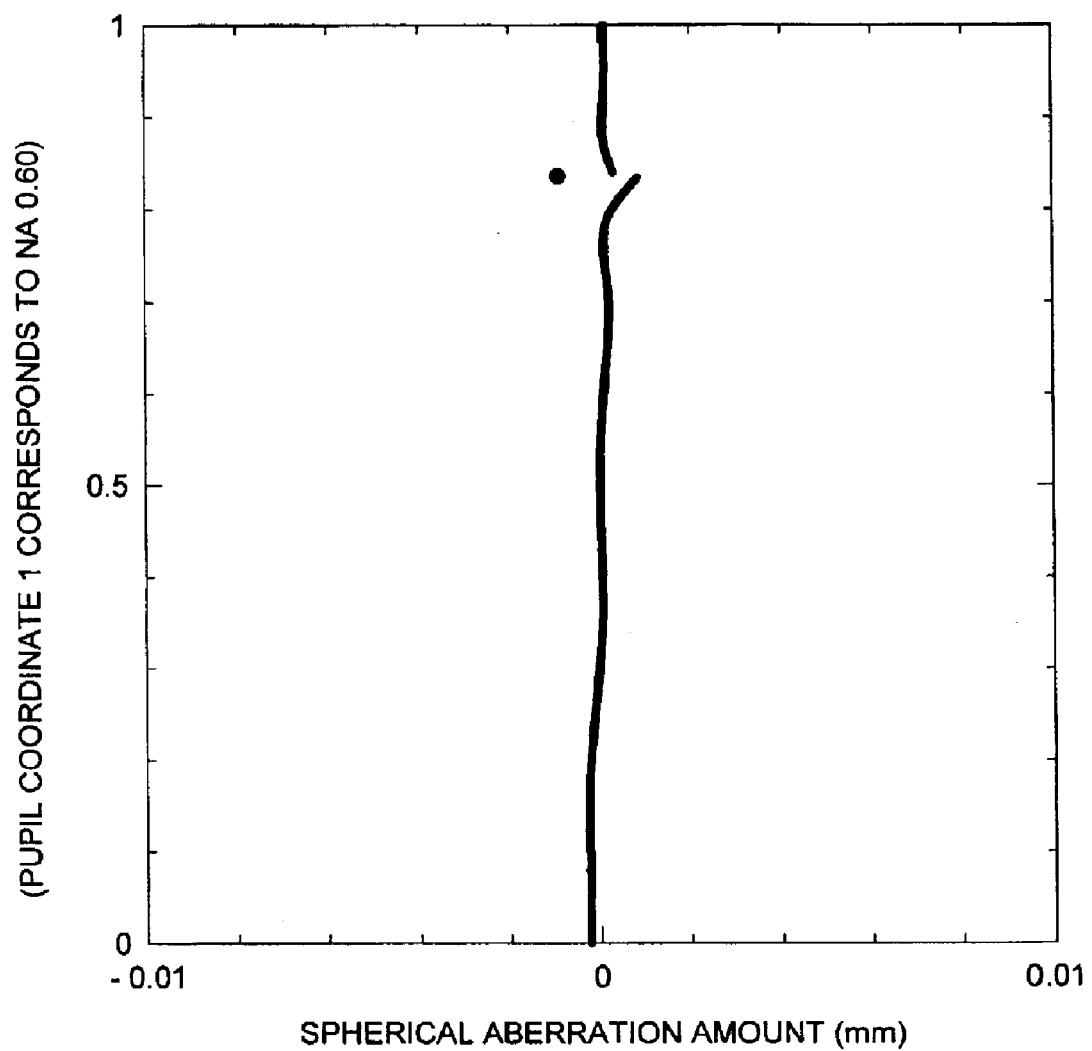
FIG. 13 is a view showing the spherical aberration (shown by the longitudinal spherical aberration amount) according to the objective lens in Example 3 for the DVD.
Figure 14:
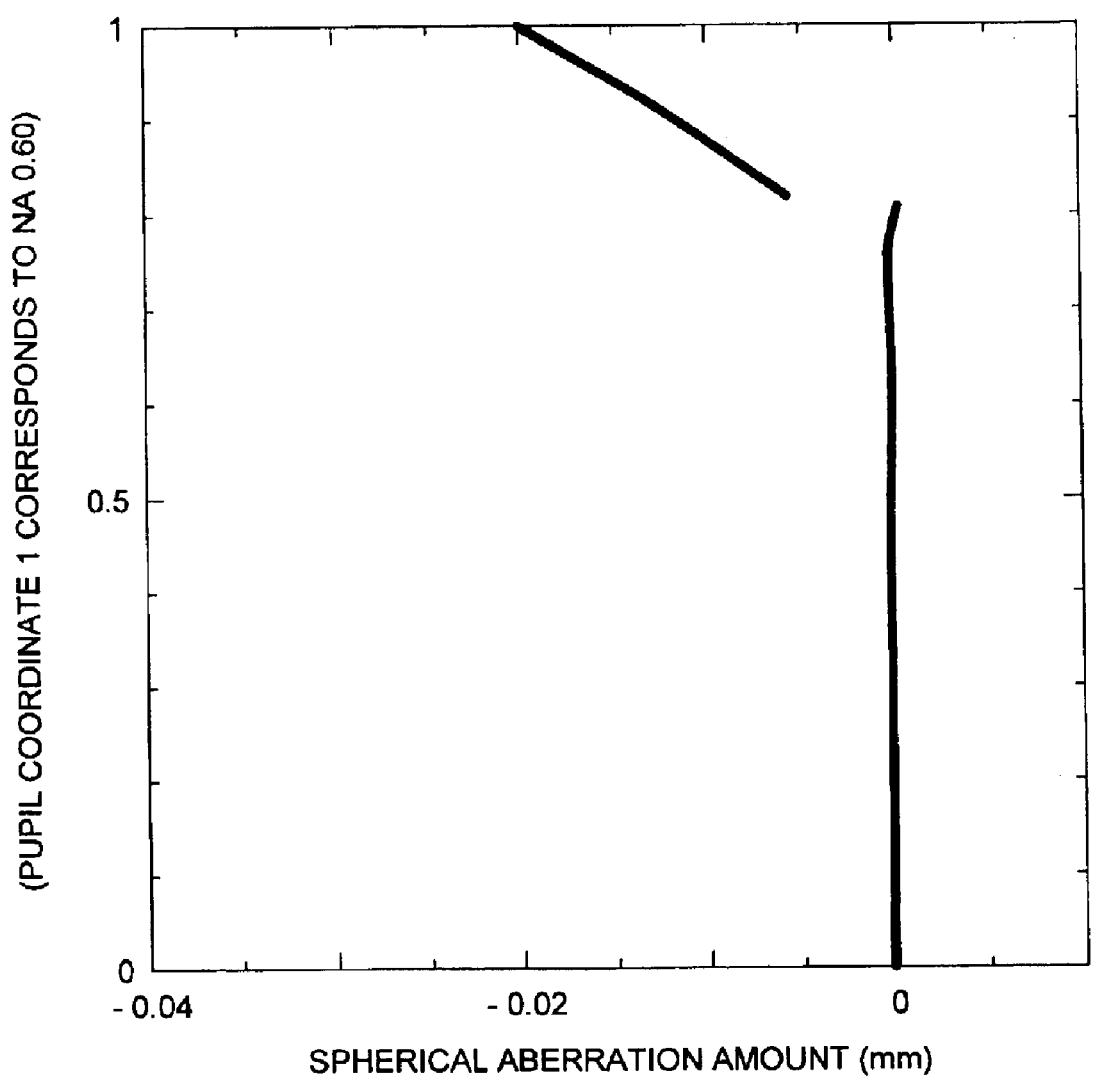
FIG. 14 is a view showing the spherical aberration (shown by the longitudinal spherical aberration amount) according to the objective lens in Example 3 for the CD.

In FIGS. 11 and 12, views of the sine condition unsatisfied amount when the DVD and CD are used for the Example 3, are shown. Further, in FIGS. 13 and 14, the spherical aberration views when the DVD and CD are used for the Example 3 are shown. Unit of the horizontal line is mm.

In the present example, when the DVD is used, the infinite light flux is made incident on the objective lens, and when the CD is used, the diverging finite light flux is made incident on the objective lens. The image formation magnification of the objective lens when the DVD is used, is the infinite magnification, and the image formation magnification of the objective lens when the CD is used, is $m = -1/15.3$. In this connection, the values defined in the claims are as follows in the present example.

| | |
|---|---|
| $SC1_{max}$ | 0.005 |
| $SC2_{max}$ | 0.053 |
| $SC1 (h_{max})$ | −0.001 |
| $SC1 (h_0)$ | 0.001 |
| $SC1 (h_0/2)$ | −0.004 |
| $SC2 (h_0)$ | −0.053 |
| $SC2 (h_0/2)$ | −0.014 |

EXAMPLE 4

In the present example, 2 optical function surfaces are formed on the both surfaces of the light source side and optical information recording medium side of the objective lens as the objective optical element. On the optical function surface including the optical axis, the inside optical function surface (common region) in which the spherical aberration when the DVD (light source wavelength 660 nm) and CD (light source wavelength 788 nm) are respectively used, is corrected, is formed, and on the optical function surface outside that, the exclusive region in which the light flux whose spherical aberration is corrected when the DVD is used, and which passes such a optical function surface when the CD is used at the best focus condition, is a flare light on the optical information recording medium surface, is formed. In Table 5, the lens data of the objective lens according to the present example is shown.

TABLE 5

Example 4 lens data
$f_1 = 2.16$ mm $f_2 = 2.18$ mm NA1: 0.65 NA2: 0.5

| The i-th surface | ri | di (660 nm) | ni (660 nm) | di (788 nm) | ni (788 nm) | |
|---|---|---|---|---|---|---|
| 0 | ∞ | | | 30.7823 | | |
| 1 | ∞ | 0.0 | 1.0 | 0.0 | 1.0 | stop diameter Φ2.808 mm |
| 2 | 1.33057 | 1.16000 | 1.53596 | 1.16000 | 1.53589 | |
| 2' | 1.33116 | 0.01372 | 1.53596 | 0.01372 | 1.53589 | |
| 3 | −5.96662 | 1.12894 | 1.0 | 0.93002 | 1.0 | |
| 3' | −16.80174 | −0.03217 | 1.0 | −0.03217 | 1.0 | |
| 4 | ∞ | 0.6 | 1.57718 | 1.2 | 1.57051 | |
| 5 | ∞ | | | | | |

*di shows the displacement from the i-th surface to the (i + 1)-th surface.
*d2', d3' respectively show the displacement from the 2nd surface, 3rd surface to the 2'nd surface, and the 3'rd surface.

Aspheric Surface Data

The 2nd surface ($0 \leq h \leq 1.147$ mm: DVD/CD common region)

Aspheric Surface Coefficient

κ −1.2356×E−0

| | | | |
|---|---|---|---|
| A1 | +4.8835 × E−2 | P1 | 4.0 |
| A2 | −1.7069 × E−2 | P2 | 6.0 |
| A3 | −4.5749 × E−3 | P3 | 8.0 |
| A4 | +1.1331 × E−3 | P4 | 10.0 |
| A5 | +1.5861 × E−2 | P5 | 12.0 |
| A6 | −6.8124 × E−3 | P6 | 14.0 |

Optical path difference function (coefficient of optical path difference function: reference wavelength 690 nm)

C2 +4.3478×E−0

C4 +8.5468×E−0

C6 +7.4019×E−1

C8 −1.8501×E+1

C10 +1.0207×E+1

The 2'nd surface (1.147 mm<h: DVD exclusive region)

Aspheric Surface Coefficient

κ −7.0331×E−0

| | | | |
|---|---|---|---|
| A1 | +1.7943 × E−1 | P1 | 4.0 |
| A2 | −5.3203 × E−2 | P2 | 6.0 |
| A3 | −4.5553 × E−2 | P3 | 8.0 |
| A4 | −3.2013 × E−2 | P4 | 10.0 |
| A5 | −8.0925 × E−3 | P5 | 12.0 |
| A6 | −4.6611 × E−4 | P6 | 14.0 |

Optical path difference function (coefficient of optical path difference function: reference wavelength 660 nm)

C2 +3.2205×E+1

C4 −3.3148×E+1

C6 +1.8655×E−0

C8 +1.1896×E+1

C10 −4.2826×E−0

The 3rd surface ($0 \leq h \leq 0.968$ mm: DVD/CD common region)

Aspheric Surface Coefficient

κ −1.5000×E+2

| A1 | −5.0506 × E−2 | P1 | 4.0 |
|----|----|----|----|
| A2 | +5.7588 × E−3 | P2 | 6.0 |
| A3 | +1.0083 × E−1 | P3 | 8.0 |
| A4 | −3.5644 × E−2 | P4 | 10.0 |
| A5 | −5.5537 × E−2 | P5 | 12.0 |
| A6 | +2.5224 × E−2 | P6 | 14.0 |
| A7 | +3.8507 × E−3 | P7 | 16.0 |
| A8 | −1.8149 × E−3 | P8 | 18.0 |

The 3'rd surface (0.968 mm<h: DVD exclusive region)
Aspheric Surface Coefficient
κ −6.1189×E+1

| A1 | +2.4455 × E−2 | P1 | 4.0 |
|----|----|----|----|
| A2 | −4.0956 × E−2 | P2 | 6.0 |
| A3 | +3.0991 × E−2 | P3 | 8.0 |
| A4 | −2.0461 × E−2 | P4 | 10.0 |
| A5 | +9.1913 × E−3 | P5 | 12.0 |
| A6 | −1.7370 × E−3 | P6 | 14.0 |
| A7 | +7.1453 × E−5 | P7 | 16.0 |

Figure 15:
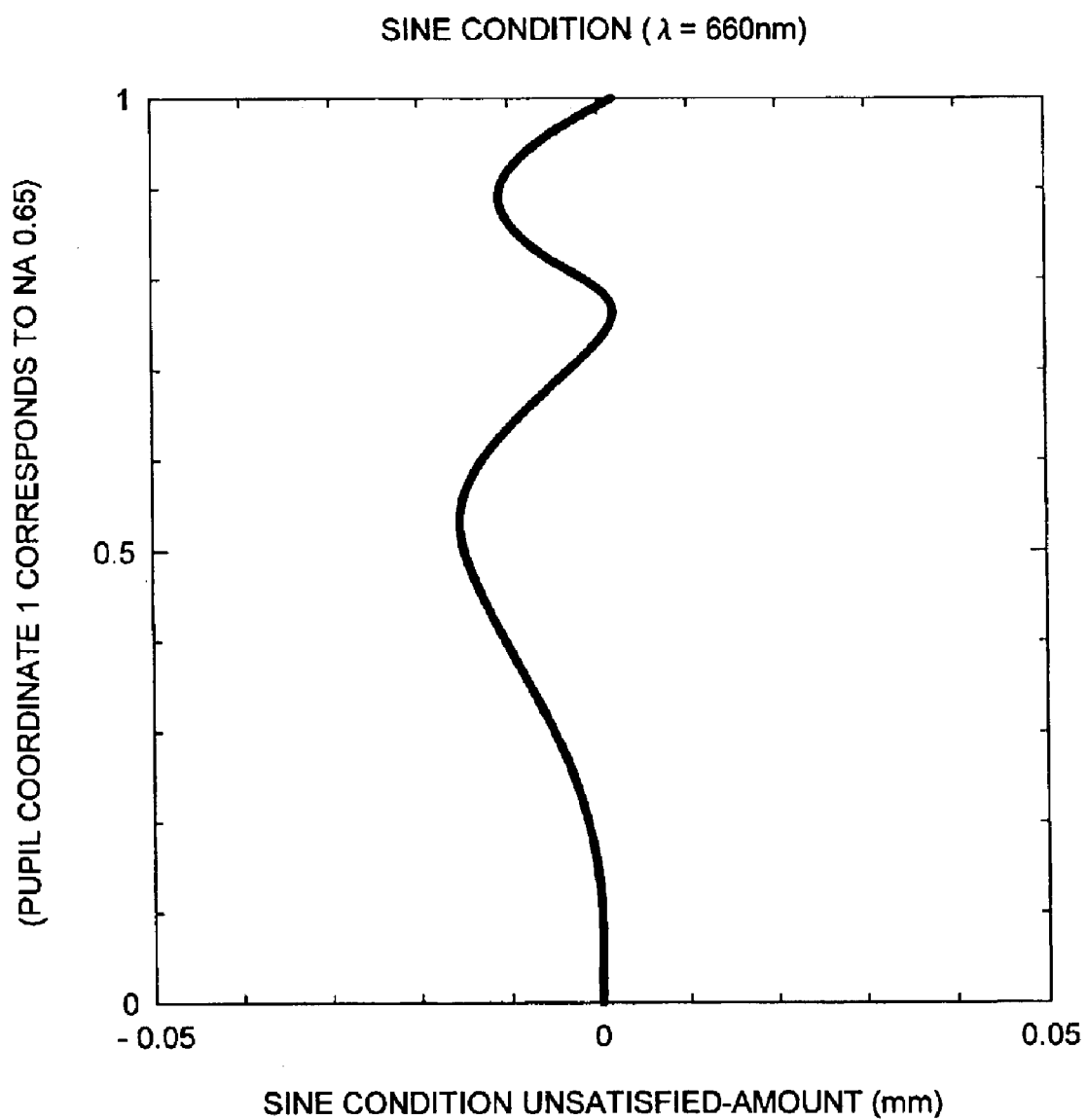
FIG. 15 is a view showing the sine condition unsatisfied amount according to the objective lens in Example 4 for the DVD.
Figure 16:
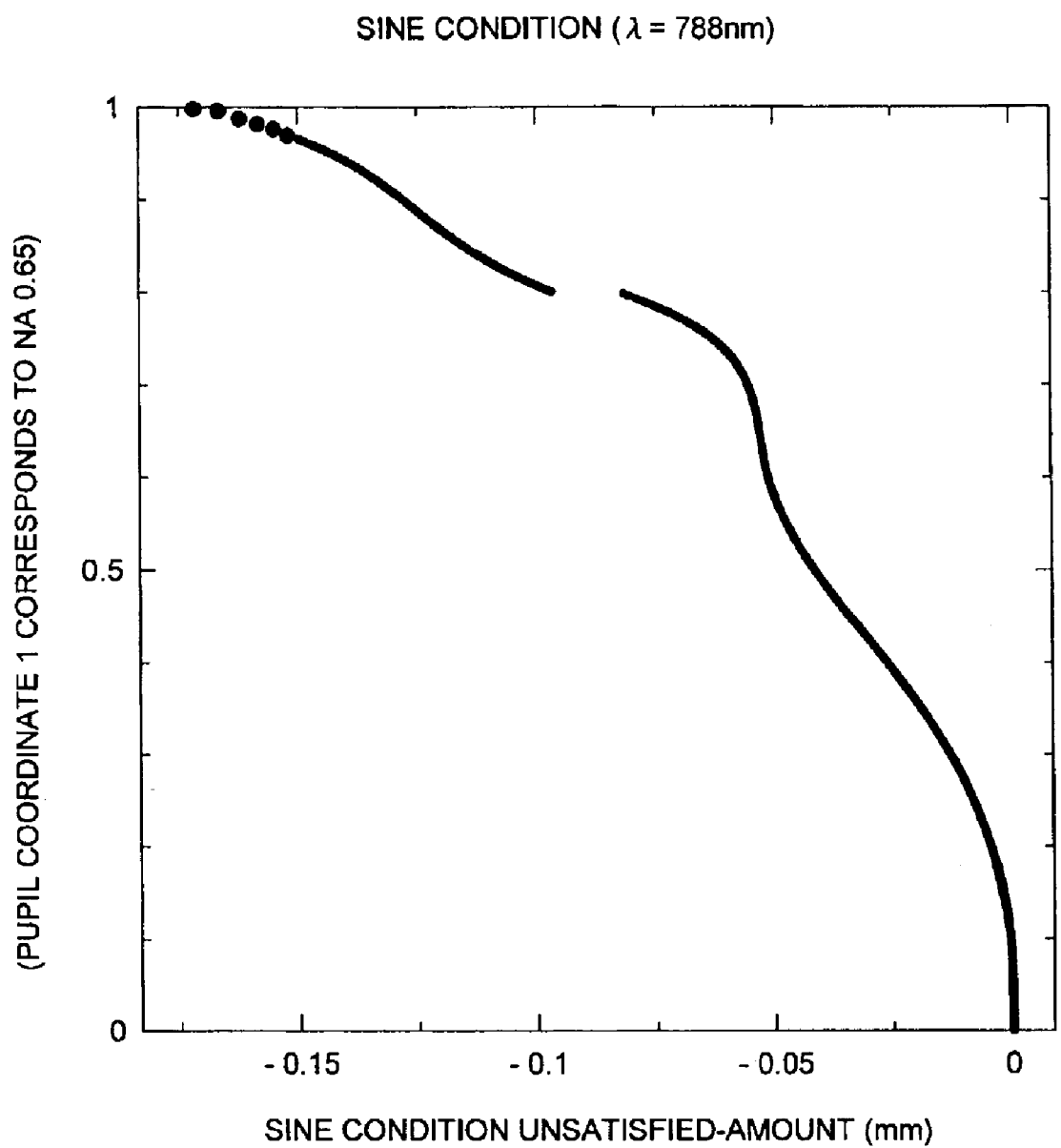
FIG. 16 is a view showing the sine condition unsatisfied amount according to the objective lens in Example 4 for the CD.
Figure 17:
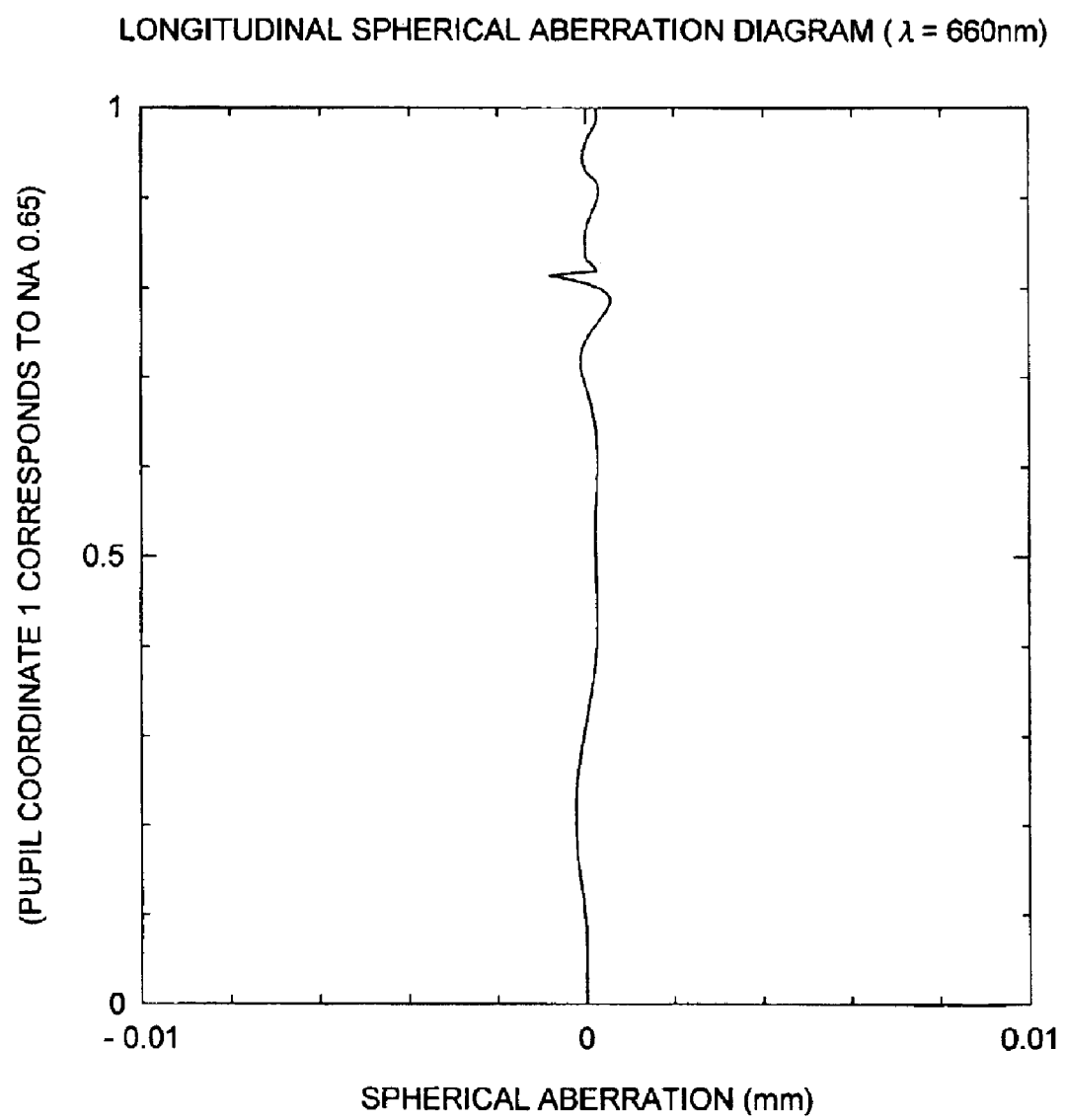
FIG. 17 is a view showing the spherical aberration (shown by the longitudinal spherical aberration amount) according to the objective lens in Example 4 for the DVD.
Figure 18:
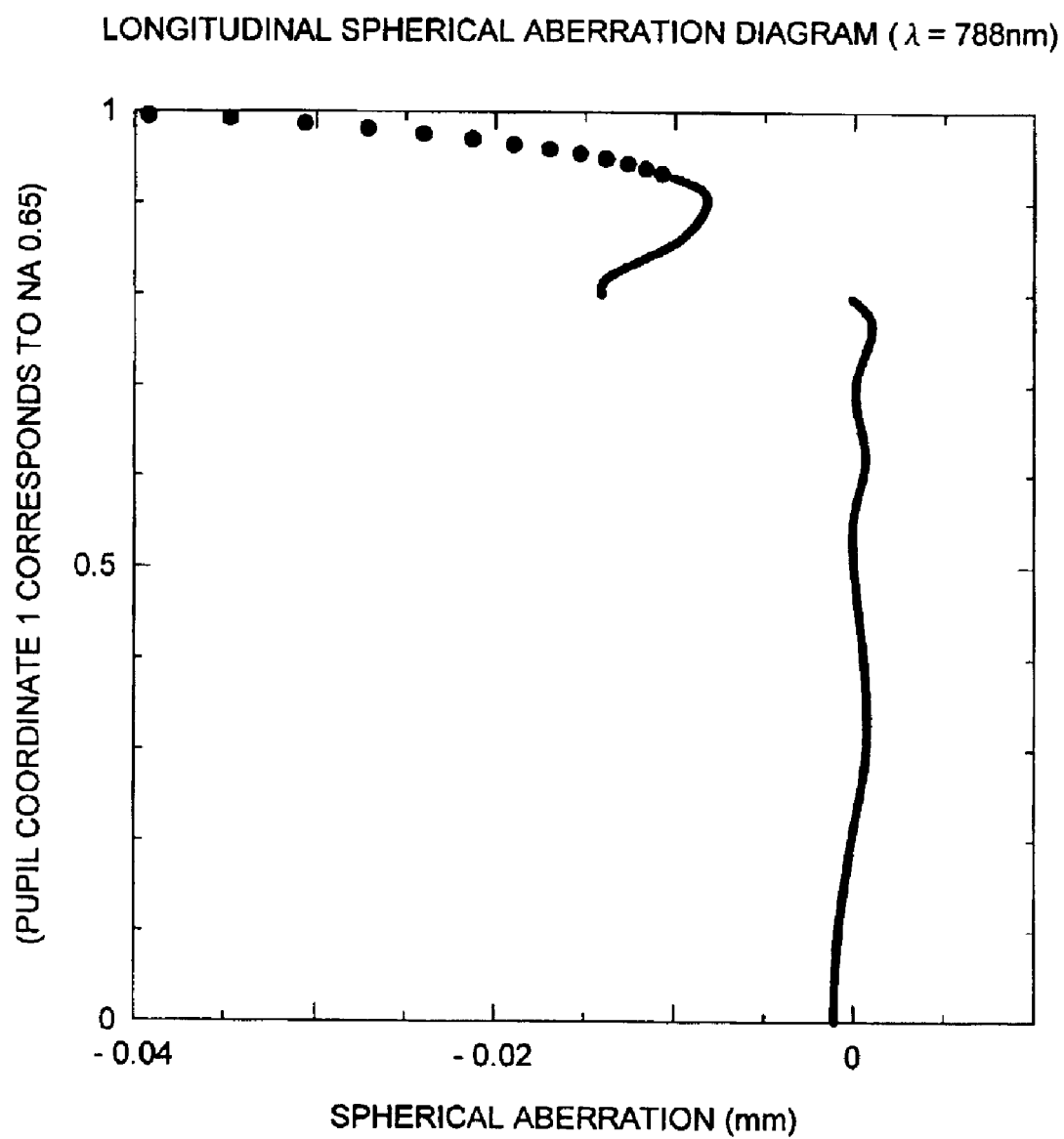
FIG. 18 is a view showing the spherical aberration (shown by the longitudinal spherical aberration amount) according to the objective lens in Example 4 for the CD.

In FIGS. 15 and 16, views of the sine condition unsatisfied amount when the DVD and CD are used for the Example 4, are shown. Further, in FIGS. 17 and 18, the spherical aberration views when the DVD and CD are used for the Example 4 are shown. Unit of the horizontal line is mm.

In the present example, when the DVD is used, the infinite light flux is made incident on the objective lens, and when the CD is used, the diverging finite light flux is made incident on the objective lens. The image formation magnification of the objective lens when the DVD is used, is the infinite magnification, and the image formation magnification of the objective lens when the CD is used, is $m=-1/13.2$. In this connection, the values defined in the claims are as follows in the present example.

| $SC1_{max}$ | 0.016 |
|----|----|
| $SC2_{max}$ | 0.080 |
| SC1 ($h_{max}$) | 0.001 |
| SC1 ($h_0$) | −0.003 |
| SC1 ($h_0/2$) | −0.011 |
| SC2 ($h_0$) | −0.080 |
| SC2 ($h_0/2$) | −0.026 |

In this connection, the present invention is not limited to the above embodiments. Although the surface of the light source side of the objective lens is made a diffractive structure, it is not limited to that, and the diffractive structure may not also provided, and for example, it may be allowable when the sine condition unsatisfied amount of the DVD is set as the example. Further, the light source is made 2-laser 1 package module light source, but, also for the discrete optical pick-up apparatus which is not modeled, its application is possible. Further, although the optical surface of the optical information recording medium side of the objective lens is structured by the same aspheric surface, it is not limited to this. On also this surface, 2 optical function surfaces are provided, and for respective exclusive region and the common region, the spherical aberration design and the sine condition unsatisfied amount design may be conducted.

The sine condition unsatisfied amount in the design of the objective lens is described as above. In contrast to this, because the production error is generated at the time of the practical objective lens production, for example, when the surface shift of the objective lens is generated, the coma component is generated also for the axial light flux. Also in this case, in the meaning of the balance design of the outside-axis coma, it is needless to say that the design to satisfy the requirement of the present invention is preferable. Further, the order of the diffraction design is made a design to use the primary diffracted ray in the DVD, CD and the exclusive region and the common region together, but, it is not limited to this. Higher order of the diffraction order may also be used, or/and for the DVD and CD, the design to use the different order diffraction order light may be conducted.

According to the present invention, the objective optical element for the optical pick-up apparatus by which the coma can be corrected with good balance, and the recording or reproducing of the information can be adequately conducted onto the different optical information recording medium, and the optical pick-up apparatus and the optical information recording reproducing apparatus can be provided.

What is claimed is:

1. An objective optical element for use in an optical pickup apparatus which comprises a first light source to emit a light flux having a wavelength λ1 for conducting recording or reproducing information for a first information recording medium with a transparent substrate having a thickness t1, a second light source to emit a light flux having a wavelength λ2 (λ1<λ2) for conducting recording or reproducing information for a second information recording medium with a transparent substrate having a thickness t2 (t1<t2), and a light converging system including the objective optical element to converge the light flux emitted from the first and second light sources onto an information recording plane through the respective transparent substrates of the first and second information recording mediums, the objective optical element comprising:

an objective lens to converge the light flux emitted from the first and second light sources; and an optical functional surface to provide an optical action to the light flux and the optical functional surface including a common region including an optical axis and used for recording and/or reproducing information for both of the first and second information recording mediums and an exclusive region mainly used for recording and/or reproducing information for the first information recording medium;

wherein the objective optical element forms a spot on a first recording medium with the diameter of the spot determined by an effective diameter and a focal length of the objective optical element, wherein when an infinite object distance light ray with a height h from the optical axis is emitted from the objective optical element, U is an angle formed by the emitted infinite object distance light ray and the optical axis and a sine condition unsatisfied-amount is defied by a formula of SC(h)=h/sinU−f(f is a focal length of the objective optical element when the first and second optical information recording medium are used respectively), a sign of a minimum sine condition unsatisfied-amount on the common region when the first optical information medium is used is a negative sign and a sign of a minimum sine condition unsatisfied-amount on the common region when the second optical information medium is used is a negative sign.

2. The objective optical element of claim 1, wherein the following formulas are satisfied:

0.003 mm≦*SC*1max≦0.020 mm 0.010 mm≦*SC*2max≦0.040 mm where SC1max is a maximum sine condition unsatisfied-amount on the common region when the first optical information medium is used and SC2max is a maximum sine condition unsatisfied-amount on the common region when the second optical information medium is used.

3. The objective optical element of claim 1, wherein when the first information recording medium is used, and when a height of an outermost peripheral light ray passed through an outermost peripheral section of the effective diameter of the objective optical element is hmax from the optical axis, the sine condition unsatisfied-amount of the outermost peripheral light ray satisfies the following formula:

$$|SC1(h\text{max})| \leq 0.010 \text{ mm}.$$

4. The objective optical element of claim 1, wherein when an infinite object distance light ray with a height h from the optical axis is emitted from the objective optical element, U is an angle formed by the emitted infinite object distance light ray and the optical axis and a sine condition unsatisfied-amount is defied by a formula of SC(h)=h/sinU−f (f is a focal length of the objective optical element when the first and second optical information recording medium are used respectively), a sign of a sine condition unsatisfied-amount whose absolute value is maximum on the common region when the first optical information medium is used is a negative sign.

5. The objective optical element of claim 1, wherein when an infinite object distance light ray with a height h from the optical axis is emitted from the objective optical element, U is an angle formed by the emitted infinite object distance light ray and the optical axis and a sine condition unsatisfied-amount is defied by a formula of SC(h)=h/sinU−f (f is a focal length of the objective optical element when the first and second optical information recording medium are used respectively), the following formula is satisfied:

$$1.2 \cdot SC1_{Dmin} \leq SC1_{Smin}$$

where $SC1_{Dmin}$ is a minimum value of the sine condition unsatisfied-amount on the common region and $SC1_{Smin}$ is a minimum value of the sine condition unsatisfied-amount on the exclusive region when the first optical information medium is used.

6. The objective optical element of claim 5, wherein when the first optical information medium is used, a sign of the sine condition unsatisfied-amount whose value is maximum on the common region is a positive sign.

7. The objective optical element of claim 6, wherein when the first information optical medium is used, the following formula is satisfied, $$1.2 \cdot SC1_{Dmin} \leq SC1_{out}(h_0)$$

where $SC1_{out}(h_0)$ is the sine condition unsatisfied-amount of a light ray having passed through an innermost section of the exclusive region and $SC1_{Dmin}$ is a minimum value of the sine condition unsatisfied-amount on the common region.

8. The objective optical element of claim 7, wherein when the first optical information medium is used, a sine condition unsatisfied-amount whose absolute value is maximum exists on the common region, wherein the following formula is satisfied:

$$0.5 \leq \text{COMA1/COMA2} \leq 1.0$$

where COMA1 is a coma aberration (λ1 rms) when a light flux goes slantingly to be incident with a view angle of 1° onto the objective optical element when the first optical information medium is used, and COMA2 is a coma aberration (λ2 rms) when a light flux goes slantingly to be incident with a view angle of 1° onto the objective optical element when the second optical information medium is used.

9. The objective optical element of claim 1, wherein when the first optical information medium is used, the sine condition unsatisfied-amount becomes discontinuous toward a negative (−) side at a portion where the common region is switched to the exclusive region.

10. The objective optical element of claim 1, wherein the optical functional surface of the objective optical element comprises a diffractive structure having a center on the optical axis and an information recording medium side surface of the optical functional surface comprises a common region including an optical axis and used for recording and/or reproducing information for both of the first and second information recording mediums, an exclusive region provided at an outside of the common region and mainly used for recording and/or reproducing information for the first information recording medium and a stepped section adjoining the common region and the exclusive region and provided to be almost parallel to the optical axis and to face toward an outside from the optical axis.

11. The objective optical element of claim 1, wherein a diffractive structure having a center on the optical axis is formed on the common region of the light source side optical functional surface.

12. The objective optical element of claim 11, wherein a magnification of the objective optical element itself when the first and second optical information recording medium are used respectively is an infinite magnification.

13. The objective optical element of claim 11, wherein a magnification m of an optical system from the light source to the optical information recording medium is satisfied the following formula when the first and second optical information mediums are used respectively:

$$-\tfrac{1}{5} \leq m \leq -\tfrac{1}{10}.$$

14. The objective optical element of claim 11, wherein a magnification of the objective optical element itself when the first optical information recording medium is used is different form the magnification of the objective optical element itself when the second optical information recording medium is used.

15. The objective optical element of claim 14, wherein the light flux emitted from the first light source comes to be incident as an infinite light flux onto the objective optical element and the light flux emitted from the second light source comes to be incident as a finite light flux onto the objective optical element.

16. The objective optical element of claim 15, wherein a focal length of the objective optical element is in a range of 1.0 mm ≦ f ≦ 4.0 mm.

17. The objective optical element of claim 16, wherein a focal length of the objective optical element is in a range of 1.5 mm ≦ f ≦ 3.5 mm, the thickness t1 of the transparent substrate of the first information recording medium is half of the thickness t2 of the transparent substrate of the second information recording medium (2×t1≈t2), and the following formulas are satisfied:

$$0.59 \leq NA1 \leq 0.68 \text{ and } 0.43 \leq NA2 \leq 0.58$$

where NA1 is a numerical aperture when the first information recording medium is used and NA2 is a numerical aperture when the second information recording medium is used.

18. The objective optical element of claim 11, wherein a coma aberration on a view angle of 1° is 0.05 λrms or less.

19. The objective optical element of claim 18, wherein the first light source and the second light source are made in one unit.

20. An optical pickup apparatus, comprising:
a first light source to emit a light flux having a wavelength λ1 for conducting recording or reproducing information for a first information recording medium with a transparent substrate having a thickness t1;
a second light source to emit a light flux having a wavelength λ2(λ1<λ2)for conducting recording or reproducing information for a second information recording medium with a transparent substrate having a thickness t2 (t1<t2); and
a light converging system to converge the light flux emitted from the first and second light sources onto an information recording plane through the respective transparent substrates of the first and second information recording mediums, wherein the light converging system includes the objective optical element described in claim 1.

21. An optical information recording reproducing apparatus, comprising
the optical pickup apparatus described in claim 20.

22. An objective optical element for use in an optical pickup apparatus which comprises a first light source to emit a light flux having a wavelength λ1 for conducting recording or reproducing information for a first information recording medium with a transparent substrate having a thickness t1, a second light source to emit a light flux having a wavelength λ2 (λ1<λ2) for conducting recording or reproducing information for a second information recording medium with a transparent substrate having a thickness t2 (t1<t2), and a light converging system including the objective optical element to converge the light flux emitted from the first and second light sources onto an information recording plane through the respective transparent substrates of the first and second information recording mediums, the objective optical element comprising:
an objective lens to converge the light flux emitted from the first and second light sources; and
an optical functional surface to provide an optical action to the light flux and the optical functional surface including a common region including an optical axis and used for recording and/or reproducing information for both of the first and second information recording mediums and an exclusive region mainly used for recording and/or reproducing information for the first information recording medium;
wherein the objective optical element forms a spot on a first recording medium with the diameter of the spot determined by an effective diameter and a focal length of the objective optical element,
wherein when the first optical information medium is used, a sine condition unsatisfied-amount whose value is maximum exists on the common region,
wherein the following formula is satisfied:

$$0.5 < COMA2/COMA1 < 1.0$$

where COMA1 is a coma aberration (λ1 rms) when a light flux goes slantingly to be incident with a view angle of 1° onto the objective optical element when the first optical information medium is used, and
COMA2 is a coma aberration (λ2 rms) when a light flux goes slantingly to be incident with a view angle of 1° onto the objective optical element when the second optical information medium is used.

23. The objective lens of claim 22, wherein when an infinite object distance light ray with a height h from the optical axis is emitted from the objective optical element, U is an angle formed by the emitted infinite object distance light ray and the optical axis and a sine condition unsatisfied-amount is defied by a formula of SC(h)=h/sinU−f (f is a focal length of the objective optical element when the first and second optical information recording medium are used respectively), a sign of a sine condition unsatisfied-amount whose absolute value is maximum on the common region when the first optical information medium is used is a negative sign.

24. The objective lens of claim 23, wherein when an infinite object distance light ray with a height h from the optical axis is emitted from the objective optical element, U is an angle formed by the emitted infinite object distance light ray and the optical axis and a sine condition unsatisfied-amount is defied by a formula of SC(h)=h/sinU−f (f is a focal length of the objective optical element when the first and second optical information recording medium are used respectively), the following formula is satisfied:

$$1.2 \cdot SC1_{Dmin} \leq SC1_{Smin}$$

where SC1 is a minimum value of the sine condition unsatisfied-amount on the common region and SC1 is a minimum value of the sine condition unsatisfied-amount on the exclusive region when the first optical information medium is used.

25. The objective optical element of any one of claims 22, 23, 9 and 10, wherein a diffractive structure having a center on the optical axis is formed on the common region of the light source side optical functional surface.

26. The objective optical element of claim 25, wherein a magnification of the objective optical element itself when the first and second optical information recording medium are used respectively is an infinite magnification.

27. The objective optical element of claim 25, wherein a magnification m of an optical system from the light source to the optical information recording medium is satisfied the following formula when the first and second optical information mediums are used respectively:

$$-\frac{1}{5} \leq m \leq -\frac{1}{10}.$$

28. The objective optical element of claim 25 wherein a magnification of the objective optical element itself when the first optical information recording medium is used is different form the magnification of the objective optical element itself when the second optical information recording medium is used.

29. The objective optical element of claim 28, wherein the light flux emitted from the first light source comes to be incident as an infinite light flux onto the objective optical element and the light flux emitted from the second light source comes to be incident as a finite light flux onto the objective optical element.

30. The objective optical element of claim 29, wherein a focal length of the objective optical element is in a range of 1.0 mm≦f≦4.0 mm.

31. The objective optical element of claim 30, wherein a focal length of the objective optical element is in a range of 1.5 mm≦f≦3.5 mm, the thickness t1 of the transparent substrate of the first information recording medium is half of the thickness t2 of the transparent substrate of the second information recording medium (2×t1≈t2), and the following formulas are satisfied:

$$0.59 \leq NA1 \leq 0.68 \text{ and } 0.43 \leq NA2 \leq 0.58$$

where NA1 is a numerical aperture when the first information recording medium is used and NA2 is a numerical aperture when the second information recording medium is used.

32. The objective optical element of claim 25, wherein a coma aberration on a view angle of 1° is 0.05 λrms or less.

33. The objective optical element of claim 32, wherein the first light source and the second light source are made in one unit.

34. An optical pickup apparatus, comprising:
- a first light source to emit a light flux having a wavelength λ1 for conducting recording or reproducing information for a first information recording medium with a transparent substrate having a thickness t1;
- a second light source to emit a light flux having a wavelength λ2 (λ1<λ2) for conducting recording or reproducing information for a second information recording medium with a transparent substrate having a thickness t2 (t1<t2); and
- a light converging system to converge the light flux emitted from the first and second light sources onto an information recording plane through the respective transparent substrates of the first and second information recording mediums, wherein the light converging system includes the objective optical element described in claim 1.

35. An optical information recording reproducing apparatus, comprising the optical pickup apparatus described in claim 34.

36. An objective optical element for use in an optical pickup apparatus which comprises a first light source to emit a light flux having a wavelength λ1 for conducting recording or reproducing information for a first information recording medium with a transparent substrate having a thickness t1, a second light source to emit a light flux having a wavelength λ2 (λ1<λ2) for conducting recording or reproducing information for a second information recording medium with a transparent substrate having a thickness t2 (t1<t2), and a light converging system including the objective optical element to converge the light flux emitted from the first and second light sources onto an information recording plane through the respective transparent substrates of the first and second information recording media, the objective optical element comprising:
- an objective lens to converge the light flux emitted from the first and second light sources; and
- an optical functional surface to provide an optical action to the light flux and the optical functional surface including a common region including an optical axis and used for recording and/or reproducing information for both of the first and second information recording mediums and an exclusive region mainly used for recording and/or reproducing information for the first information recording medium;
- wherein the objective optical element forms a spot on a first recording medium with the diameter of the spot determined by an effective diameter and a focal length of the objective optical element, wherein in the case that a height from the optical axis is placed on the vertical line (x), a sine condition unsatisfied amount when the second optical information recording medium is used is placed on the horizontal line (y) and a differential value (dy/dx) on a curve representing a relationship between the height from the optical axis and the sine condition unsatisfied amount on the common region is obtained, when a height of a light ray passing an outermost peripheral section of an effective diameter of the objective optical element is $h_{CDNA}$ from the optical axis, the following formula is satisfied:

$(dy/dx) \leq 0$ when $h < 0.6 h_{CDNA}$, and when at a first height on the curve, a straight line having an inclination corresponding to the differential value at the first height is drawn, the curve has a region residing at a positive side of the straight line on a farther side than the height from the optical axis.

37. The objective optical element of claim 36, wherein in the case that a height from the optical axis is placed on the vertical line(x), a sine condition unsatisfied amount when the first optical information recording medium is used is placed on the horizontal line (y) and a second order differential value ($d^2y/dx^2$) on a curve representing a relationship between the height from the optical axis and the sine condition unsatisfied amount on the common region is obtained, when a height of a light ray passing an outermost section of the common region is $h_0$ from the optical axis, the following formula is satisfied:

$(d^2y/dx^2) > 0$ when $0.5 h_0 < h < 0.8 h_0$.

38. The objective optical element of claim 36, wherein in the case that a height from the optical axis is placed on the vertical line (x), a sine condition unsatisfied amount when the first optical information recording medium is used is placed on the horizontal line (y) and a differential value (dy/dx) on a curve representing a relationship between the height from the optical axis and the sine condition unsatisfied amount on the exclusive region is obtained, when at a height on the curve, a straight line having an inclination corresponding to the differential value at the first height is drawn, the curve has a region residing at a positive side of the straight line on a farther side than the first height from the optical axis.

39. The objective optical element of claim 36, wherein at the time of using the first information recording medium, when an infinite object distance light ray with a height h from the optical axis is emitted from the objective optical element, U is an angle formed by the emitted infinite object distance light ray and the optical axis and a sine condition unsatisfied-amount is defied by a formula of SC1(h)=h/sinU−f (f is a focal length of the objective optical element when the first information recording medium is used), the sine condition unsatisfied-amount on the exclusive region increases monotonously as a height of an incident light ray on the optical element increases from the optical axis.

40. The objective optical element of claim 36, wherein when an infinite object distance light ray with a height h from the optical axis is emitted from the objective optical element, U is an angle formed by the emitted infinite object distance light ray and the optical axis and a sine condition unsatisfied-amount is defied by a formula of SC(h)=h/sinU−f (f is a focal length of the objective optical element when the first and second optical information recording medium are used respectively), a sign of a minimum sine condition unsatisfied-amount on the common region when the first optical information medium is used is a negative sign and a sign of a minimum sine condition unsatisfied-amount on the common region when the second optical information medium is used is a negative sign.

41. The objective optical element of claim 36, wherein when an infinite object distance light ray with a height h from the optical axis is emitted from the objective optical element, U is an angle formed by the emitted infinite object distance light ray and the optical axis and a sine condition unsatisfied-amount is defied by a formula of SC(h)=h/sinU−f (f is a focal length of the objective optical element when the first and second optical information recording medium are used respectively), the following formulas are satisfied:

0.003 mm ≤ SC1max ≤ 0.020 mm 0.010 mm ≤ SC2max ≤ 0.040 mm where SC1max is a maximum sine condition unsatisfied-amount on the common region when the first optical information medium is used and SC2max is a maximum sine condition unsatisfied-amount on the common region when the second optical information medium is used.

42. The objective optical element of claim 41, wherein when the first information recording medium is used, and when a height of an outermost peripheral light ray passed through an outermost peripheral section of the effective diameter of the objective optical element is hmax from the optical axis, the sine condition unsatisfied-amount of the outermost peripheral light ray satisfies the following formula:

$$|SC1(h\text{max})| \leq 0.010 \text{ mm}.$$

43. The objective optical element of claim 36, wherein the optical functional surface of the objective optical element comprises a diffractive structure having a center on the optical axis and an information recording medium side surface of the optical functional surface comprises a common region including an optical axis and used for recording and/or reproducing information for both of the first and second information recording mediums, an exclusive region provided at an outside of the common region and mainly used for recording and/or reproducing information for the first information recording medium and a stepped section adjoining the common region and the exclusive region and provided to be almost parallel to the optical axis and to face toward an outside from the optical axis.

44. The objective optical element of claim 43, wherein the stepped section has a step length d2 satisfying the following formula:

$$0.000 \text{ mm} < d2 \leq 0.004 \text{ mm}.$$

45. An optical pickup apparatus, comprising:
a first light source to emit a light flux having a wavelength $\lambda 1$ for conducting recording or reproducing information for a first information recording medium with a transparent substrate having a thickness t1;
a second light source to emit a light flux having a wavelength $\lambda 2$ ($\lambda 1 < \lambda 2$) for conducting recording or reproducing information for a second information recording medium with a transparent substrate having a thickness t2 (t1<t2); and
a light converging system to converge the light flux emitted from the first and second light sources onto an information recording plane through the respective transparent substrates of the first and second information recording mediums, wherein the light converging system includes the objective optical element described in claim 36.

46. An optical information record reproducing apparatus, comprising the optical pickup apparatus described in claim 45.

47. The objective optical element of any one of claims 36, 23, 32, 9 and 10, wherein a diffractive structure having a center on the optical axis is formed on the common region of the light source side optical functional surface.

48. The objective optical element of claim 47, wherein a magnification of the objective optical element itself when the first and second optical information recording medium are used respectively is an infinite magnification.

49. The objective optical element of claim 47, wherein a magnification m of an optical system from the light source to the optical information recording medium is satisfied the following formula when the first and second optical information mediums are used respectively:

$$-\tfrac{1}{5} \leq m \leq -\tfrac{1}{10}.$$

50. The objective optical element of claim 47, wherein a magnification of the objective optical element itself when the first optical information recording medium is used is different form the magnification of the objective optical element itself when the second optical information recording medium is used.

51. The objective optical element of claim 50, wherein the light flux emitted from the first light source comes to be incident as an infinite light flux onto the objective optical element and the light flux emitted from the second light source comes to be incident as a finite light flux onto the objective optical element.

52. The objective optical element of claim 51, wherein a focal length of the objective optical element is in a range of 1.0 mm $\leq$ f $\leq$ 4.0 mm.

53. The objective optical element of claim 52, wherein a focal length of the objective optical element is in a range of 1.5 mm $\leq$ f $\leq$ 3.5 mm, the thickness t1 of the transparent substrate of the first information recording medium is half of the thickness t2 of the transparent substrate of the second information recording medium (2×t1≈t2), and the following formulas are satisfied:

$$0.59 \leq NA1 \leq 0.68 \text{ and } 0.43 \leq NA2 \leq 0.58$$

where NA1 is a numerical aperture when the first information recording medium is used and NA2 is a numerical aperture when the second information recording medium is used.

54. The objective optical element of claim 47, wherein a coma aberration on a view angle of 1° is 0.05 $\lambda$rms or less.

55. The objective optical element of claim 54, wherein the first light source and the second light source are made in one unit.

56. An objective optical element for use in an optical pickup apparatus which comprises a first light source to emit a light flux having a wavelength $\lambda 1$ for conducting recording or reproducing information for a first information recording medium with a transparent substrate having a thickness t1, a second light source to emit a light flux having a wavelength $\lambda 2$ ($\lambda 1 < \lambda 2$) for conducting recording or reproducing information for a second information recording medium with a transparent substrate having a thickness t2 (t1<t2), and a light converging system including the objective optical element to converge the light flux emitted from the first and second light sources onto an information recording plane through the respective transparent substrates of the first and second information recording media, the objective optical element comprising:
an objective lens to converge the light flux emitted from the first and second light sources; and
an optical functional surface to provide an optical action to the light flux and the optical functional surface including a common region including an optical axis and used for recording and/or reproducing information for both of the first and second information recording mediums and an exclusive region mainly used for recording and/or reproducing information for the first information recording medium;
wherein the objective optical element forms a spot on a first recording medium with the diameter of the spot determined by an effective diameter and a focal length of the objective optical element,
wherein when the first information recoding medium is used, and when an infinite object distance light ray with a height h from the optical axis is emitted from the objective optical element, U is an angle formed by the emitted infinite object distance light ray and the optical axis and a sine condition unsatisfied-amount is defied by a formula of SC1(h)=h/sinU−f (f is a focal length of the objective optical element when the first optical information recording medium is used), the following formulas are satisfied:

$$SC1(h_0/2) \leq SC1_{out}(h_0)$$

$$SC1(h_0/2) \leq 0$$

$$SC1(h_{max}) \leq 0$$

where a height of an innermost peripheral light ray passed through an innermost section of the exclusive region is $h_0$ from the optical axis, the sine condition unsatisfied-amount of the innermost peripheral light ray is $SC1_{out}(h_0)$, and a height of a light ray passed through an outermost section of the effective diameter of the objective optical element is $h_{max}$ from the optical axis.

57. The objective optical element of claim 56, wherein a sign of the sine condition unsatisfied-amount of a light ray passed through the outermost peripheral section of the common region is a positive sign.

58. The objective optical element of claim 57, wherein the optical functional surface of the objective optical element comprises a diffractive structure having a center on the optical axis and an information recording medium side surface of the optical functional surface comprises a common region including an optical axis and used for recording and/or reproducing information for both of the first and second information recording mediums, an exclusive region provided at an outside of the common region and mainly used for recording and/or reproducing information for the first information recording medium and a stepped section adjoining the common region and the exclusive region and provided to be almost parallel to the optical axis and to face toward an outside from the optical axis.

59. The objective optical element of claim 58, wherein the stepped section has a step length d2 satisfying the following formula:

$$0.000 \text{ mm} < d2 \leq 0.004 \text{ mm}.$$

60. The objective optical element of any one of claims 56, 23, 32, 9 and 10, wherein a diffractive structure having a center on the optical axis is formed on the common region of the light source side optical functional surface.

61. The objective optical element of claim 60, wherein a magnification of the objective optical element itself when the first and second optical information recording medium are used respectively is an infinite magnification.

62. The objective optical element of claim 60, wherein a magnification m of an optical system from the light source to the optical information recording medium is satisfied the following formula when the first and second optical information mediums are used respectively:

$$-1/5 \leq m \leq -1/10.$$

63. The objective optical element of claim 60, wherein a magnification of the objective optical element itself when the first optical information recording medium is used is different form the magnification of the objective optical element itself when the second optical information recording medium is used.

64. The objective optical element of claim 63, wherein the light flux emitted from the first light source comes to be incident as an infinite light flux onto the objective optical element and the light flux emitted from the second light source comes to be incident as a finite light flux onto the objective optical element.

65. The objective optical element of claim 64, wherein a focal length of the objective optical element is in a range of $1.0 \text{ mm} \leq f \leq 4.0 \text{ mm}$.

66. The objective optical element of claim 65, wherein a focal length of the objective optical element is in a range of $1.5 \text{ mm} \leq f \leq 3.5 \text{ mm}$, the thickness t1 of the transparent substrate of the first information recording medium is half of the thickness t2 of the transparent substrate of the second information recording medium ($2 \times t1 \approx t2$), and the following formulas are satisfied:

$$0.59 \leq NA1 \leq 0.68 \text{ and } 0.43 \leq NA2 \leq 0.58$$

where NA1 is a numerical aperture when the first information recording medium is used and NA2 is a numerical aperture when the second information recording medium is used.

67. The objective optical element of claim 60, wherein a coma aberration on a view angle of 1° is 0.05 λrms or less.

68. The objective optical element of claim 67, wherein the first light source and the second light source are made in one unit.

69. An optical pickup apparatus, comprising:

a first light source to emit a light flux having a wavelength λ1 for conducting recording or reproducing information for a first information recording medium with a transparent substrate having a thickness t1;

a second light source to emit a light flux having a wavelength λ2 (λ1<λ2) for conducting recording or reproducing information for a second information recording medium with a transparent substrate having a thickness t2 (t1<t2); and a light converging system to converge the light flux emitted from the first and second light sources onto an information recording plane through the respective transparent substrates of the first and second information recording mediums, in the light converging system includes the objective optical element described in claim 56.

70. An optical information recording reproducing apparatus, comprising the optical pickup apparatus described in claim 69.

71. An objective optical element for use in an optical pickup apparatus which comprises a first light source to emit a light flux having a wavelength λ1 for conducting recording or reproducing information for a first information recording medium with a transparent substrate having a thickness t1, a second light source to emit a light flux having a wavelength λ2 (λ1<λ2) for conducting recording or reproducing information for a second information recording medium with a transparent substrate having a thickness t2 (t1<t2), and a light converging system including the objective optical element to converge the light flux emitted from the first and second light sources onto an information recording plane through the respective transparent substrates of the first and second information recording media, the objective optical element comprising:

an objective lens to converge the light flux emitted from the first and second light sources; and an optical functional surface to provide an optical action to the light flux;

wherein a light source side optical functional surface of the objective optical element comprises a diffractive structure having a center on the optical axis, wherein an optical information recording medium side optical functional surface of the objective optical element comprises a common region including an optical axis and used for recording and/or reproducing information for both of the first and second information recording mediums, an exclusive region provided at an outside of the common region and mainly used for recording and/or reproducing information for the first information recording medium and a stepped section adjoining the common region and the exclusive region and provided to be almost parallel to the optical axis and to face toward an outside in terms of the optical axis, and wherein the objective optical element forms a spot on a first recording medium with the diameter of the spot determined by an effective diameter and a focal length of the objective optical element.

72. The objective optical element of claim 71, wherein a sign of a local curvature R(h) at a adjoining section between the common region and the stepped section and a sign of a local curvature R(h) at a adjoining section between the exclusive region and the stepped section are different from each other.

73. The objective optical element of claim 72, wherein between the adjoining section between the common region and the stepped section and the adjoining section between the common region and the stepped section, the sign of the local curvature R(h) is reversed from a positive sign to a negative sign.

74. The objective optical element of claim 71, wherein the light source side optical functional surface of the objective optical element comprises a common region including an optical axis and used for recording and/or reproducing information for both of the first and second information recording mediums, an exclusive region provided at an outside of the common region and mainly used for recording and/or reproducing information for the first information recording medium and a stepped section adjoining the common region and the exclusive region and provided to be almost parallel to the optical axis and to face toward an inside in terms of the optical axis.

75. The objective optical element of claim 71, wherein the stepped section of the optical information recording medium side optical functional surface of the objective optical element has a step length d2 satisfying the following formula:

$$0.000 \text{ mm} < d2 \leq 0.004 \text{ mm}.$$

76. The objective optical element of claim 71, wherein the stepped section of the optical information recording medium side optical functional surface of the objective optical element has a step length d1 satisfying the following formula:

$$0.000 \text{ mm} < d1 \leq 0.004 \text{ mm}.$$

77. The objective optical element of claim 71, wherein a diffractive structure having a center on the optical axis is formed on the common region of the light source side optical functional surface.

78. The objective optical element of claim 71, wherein a magnification of the objective optical element itself when the first and second optical information recording medium are used respectively is an infinite magnification.

79. The objective optical element of claim 71, wherein a magnification m of an optical system from the light source to the optical information recording medium is satisfied the following formula when the first and second optical information mediums are used respectively:

$$-1/5 \leq m \leq -1/10.$$

80. The objective optical element of claim 71, wherein a magnification of the objective optical element itself when the first optical information recording medium is used is different form the magnification of the objective optical element itself when the second optical information recording medium is used.

81. The objective optical element of claim 80, wherein the light flux emitted from the first light source comes to be incident as an infinite light flux onto the objective optical element and the light flux emitted from the second light source comes to be incident as a finite light flux onto the objective optical element.

82. The objective optical element of claim 80, wherein a focal length of the objective optical element is in a range of 1.0 mm ≤ f ≤ 4.0 mm.

83. The objective optical element of claim 82, wherein a focal length of the objective optical element is in a range of 1.5 mm ≤ f ≤ 3.5 mm, the thickness t1 of the transparent substrate of the first information recording medium is half of the thickness t2 of the transparent substrate of the second information recording medium (2×t1≈t2), and the following formulas are satisfied:

$$0.59 \leq NA1 \leq 0.68 \text{ and } 0.43 \leq NA2 \leq 0.58$$

where NA1 is a numerical aperture when the first information recording medium is used and NA2 is a numerical aperture when the second information recording medium is used.

84. The objective optical element of claim 71, wherein a coma aberration on a view angle of 1° is 0.05 λrms or less.

85. The objective optical element of claim 84, wherein the first light source and the second light source are made in one unit.

86. An optical pickup apparatus, comprising:
a first light source to emit a light flux having a wavelength λ1 for conducting recording or reproducing information for a first information recording medium with a transparent substrate having a thickness t1;
a second light source to emit a light flux having a wavelength λ2 (λ1<λ2) for conducting recording or reproducing information for a second information recording medium with a transparent substrate having a thickness t2 (t1<t2); and
a light converging system to converge the light flux emitted from the first and second light sources onto an information recording plane through the respective transparent substrates of the first and second information recording mediums, wherein the light converging system includes the objective optical element described in claim 71.

87. An optical information recording reproducing apparatus, comprising the optical pickup apparatus described in claim 86.

* * * * *